United States Patent
Hermey et al.

(10) Patent No.: US 11,143,270 B2
(45) Date of Patent: Oct. 12, 2021

(54) LINE GUIDE DEVICE WITH ELECTRICAL DETECTION OF DETERIORATION AND RADIO CIRCUIT FOR SAME

(71) Applicant: igus GmbH, Cologne (DE)

(72) Inventors: Andreas Hermey, Hennef (DE); Dominik Barten, Meckenheim (DE); Thilo-Alexander Jaeker, Sankt Augustin (DE); Konstantin Schmer, Cologne (DE)

(73) Assignee: IGUS GMBH, Cologne (DE)

( * ) Notice: Subject to any disclaimer, the term of this patent is extended or adjusted under 35 U.S.C. 154(b) by 296 days.

(21) Appl. No.: 16/073,974

(22) PCT Filed: Jan. 27, 2017

(86) PCT No.: PCT/EP2017/051870
§ 371 (c)(1),
(2) Date: Jul. 30, 2018

(87) PCT Pub. No.: WO2017/129805
PCT Pub. Date: Aug. 2, 2017

(65) Prior Publication Data
US 2019/0040935 A1 Feb. 7, 2019

(30) Foreign Application Priority Data

Jan. 28, 2016 (DE) .................. 20 2016 000 501.5
Apr. 21, 2016 (DE) .................. 20 2016 102 134.0

(51) Int. Cl.
*F16L 3/00* (2006.01)
*F16G 13/16* (2006.01)
(Continued)

(52) U.S. Cl.
CPC .............. *F16G 13/16* (2013.01); *F16L 3/015* (2013.01); *G08B 13/2414* (2013.01);
(Continued)

(58) Field of Classification Search
CPC ........ F16G 13/16; F16L 3/015; H02G 3/0475; H02G 11/00; G08B 13/2414; G08B 13/2471
(Continued)

(56) References Cited

U.S. PATENT DOCUMENTS 3,473,769 A 10/1969 James
3,500,373 A 3/1970 Minasy
(Continued)

FOREIGN PATENT DOCUMENTS

CN 101504383 8/2009
CN 101932850 12/2010
(Continued)

OTHER PUBLICATIONS

English translation of International Preliminary Report on Patentability from corresponding PCT Appln. No. PCT/EP2017/051870, dated Aug. 2, 2018.
(Continued)

*Primary Examiner* — Todd M Epps
(74) *Attorney, Agent, or Firm* — Grossman, Tucker, Perreault & Pfleger, PLLC

(57) ABSTRACT

The invention concerns an active line guide like for example an energy guiding chain with detection of deterioration. An apparatus for detection of deterioration in a critical region of at least one portion of the line guide is in the form of a radio circuit and is distinguished by a transponder and at least one detector element which cooperates with the transponder and which is so arranged that the detector element changes the behaviour of the transponder at a predetermined amount of deterioration wear in the critical region. In that way a change due to wear, for example due to abrasion wear, cracking and/or fatigue breakage, can be detected wirelessly, that is to say in contact-less fashion. A corresponding system and a (Continued)

method as well as a detection module for original fitment or retro-fitment to an active line guide having a function for detection of deterioration are proposed. A radio circuit is also disclosed for particularly reliable detection of deterioration.

26 Claims, 8 Drawing Sheets

(51) Int. Cl.
*H02G 3/04* (2006.01)
*H02G 11/00* (2006.01)
*F16L 3/015* (2006.01)
*G08B 13/24* (2006.01)

(52) U.S. Cl.
CPC ....... *G08B 13/2471* (2013.01); *H02G 3/0475* (2013.01); *H02G 11/00* (2013.01)

(58) Field of Classification Search
USPC ...... 248/49, 51; 138/121, 122, 120; 59/78.1, 59/80; 174/135
See application file for complete search history.

(56) References Cited

U.S. PATENT DOCUMENTS

| | | | |
|---|---|---|---|
| 3,634,845 A | 1/1972 | Colman | |
| 3,810,147 A | 5/1974 | Lichtblau | |
| 4,813,224 A | 3/1989 | Blase | |
| 5,969,260 A | 10/1999 | Belk et al. | |
| 5,980,409 A | 11/1999 | Blase | |
| 6,161,373 A | 12/2000 | Heidrich et al. | |
| 6,173,560 B1 | 1/2001 | Weber | |
| 6,236,316 B1 | 5/2001 | Eberhardt et al. | |
| 6,354,070 B1 | 3/2002 | Blase | |
| 6,745,555 B2 * | 6/2004 | Hermey | F16G 13/16 248/49 |
| 7,209,014 B2 | 4/2007 | Finkenzeller et al. | |
| 9,435,398 B2 * | 9/2016 | Hermey | F16G 13/16 |
| 9,920,815 B2 * | 3/2018 | Jaeker | H02G 3/0475 |
| 10,591,089 B2 * | 3/2020 | Barten | F16G 13/16 |
| 2010/0295694 A1 | 11/2010 | Kauffman et al. | |
| 2012/0043980 A1 | 2/2012 | Davies | |
| 2015/0135845 A1 | 5/2015 | Hermey et al. | |
| 2015/0330479 A1 | 11/2015 | Kemper et al. | |

FOREIGN PATENT DOCUMENTS

| | | |
|---|---|---|
| CN | 105264262 | 1/2016 |
| DE | 1915773 | 10/1969 |
| DE | 3531066 | 3/1987 |
| DE | 1444264 | 4/1996 |
| DE | 19647322 | 5/1998 |
| DE | 20312266 | 8/2004 |
| DE | 202012003907 | 7/2012 |
| EP | 0173635 | 3/1998 |
| EP | 0803032 | 6/2000 |
| EP | 1479030 | 2/2003 |
| EP | 1381792 | 1/2005 |
| EP | 1521015 | 4/2005 |
| EP | 2018981 | 1/2009 |
| JP | 2007010087 | 1/2007 |
| JP | 2009503484 | 1/2009 |
| JP | 2009052714 | 3/2009 |
| JP | 2009063532 | 3/2009 |
| WO | 98/40645 | 9/1998 |
| WO | 00/41284 | 7/2000 |
| WO | 2004/090375 | 10/2004 |
| WO | 2004/099795 | 11/2004 |
| WO | 2006/005598 | 1/2006 |
| WO | 2014/102170 | 7/2014 |
| WO | 2015/118143 | 8/2015 |

OTHER PUBLICATIONS

Grote et al., Taschenbuch fuer den Maschinenbau, vol. 21, Springer (Berlin & New York), 2005, pp. W30-W31. See p. 2 of German Search Report for relevance.

Grote et al., Taschenbuch fuer den Maschinenbau, vol. 21, Springer (Berlin), 2011, pp. U102-U105. See p. 2 of German Search Report for relevance.

Search Report from related German Appln. No. 20 2016 000 501.5, dated Jul. 12, 2016.

English translation of International Search Report from corresponding PCT Appln. No. PCT/EP2017/051870, dated Apr. 20, 2017.

English translation of Office Action from related Japanese Appln. No. 2018-538834, dated Feb. 16, 2021.

Office Action from related Indian Appln. No. 201837027715, dated Feb. 5, 2021. English translation incorporated therein.

English translation of Office Action from related Korean Appln. No. 10-2018-7024374, dated Jun. 28, 2021.

English translation of Office Action from related Japanese Appln. No. 2018-538834, dated Jul. 6, 2021.

\* cited by examiner

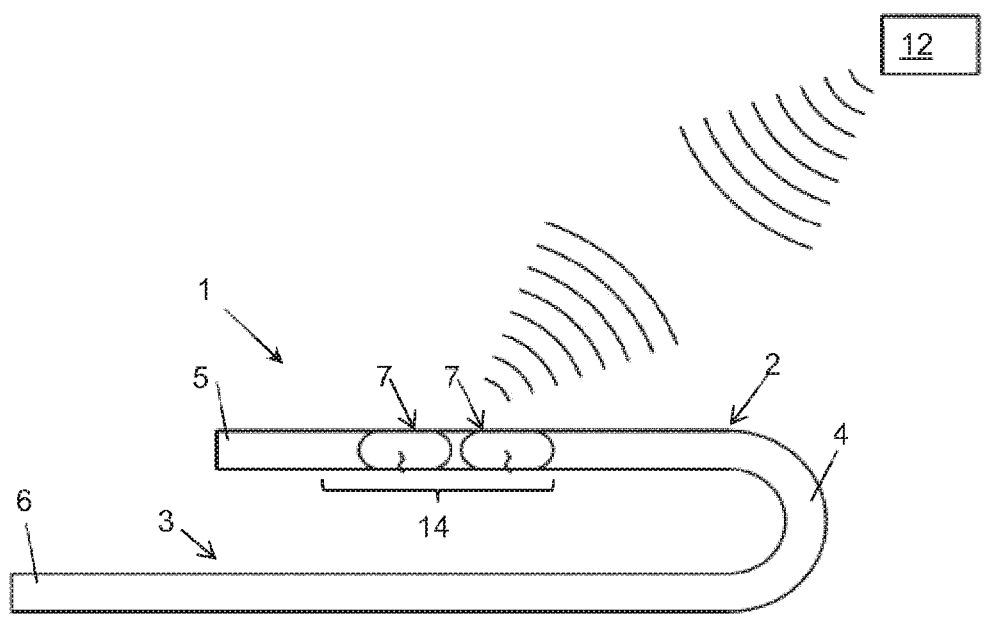
FIG.4
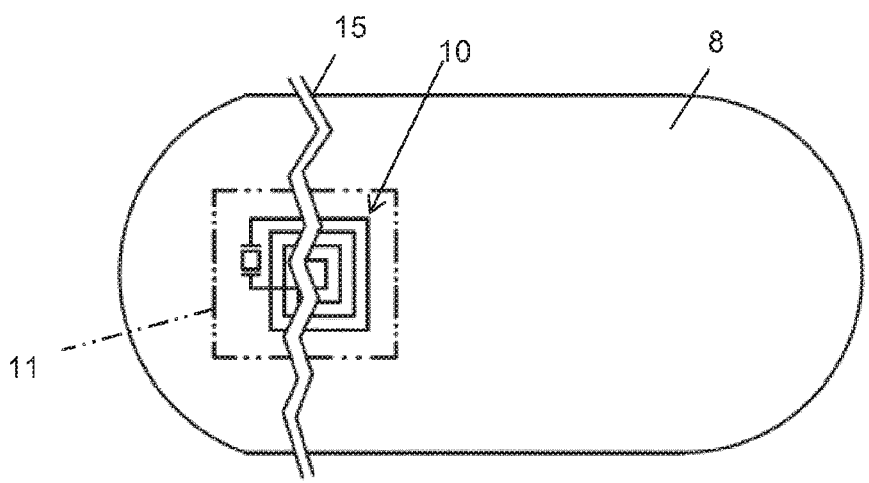
FIG.5
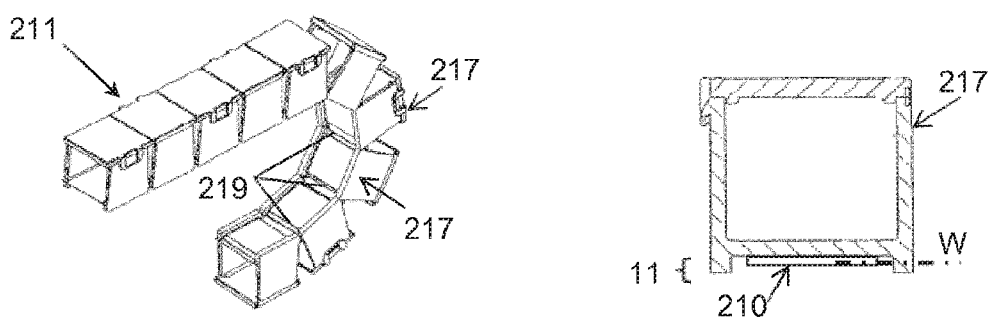
FIG.21A
FIG.21B

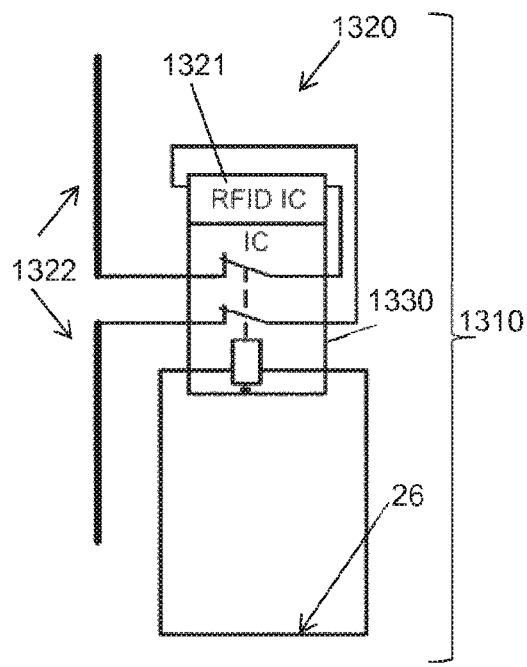
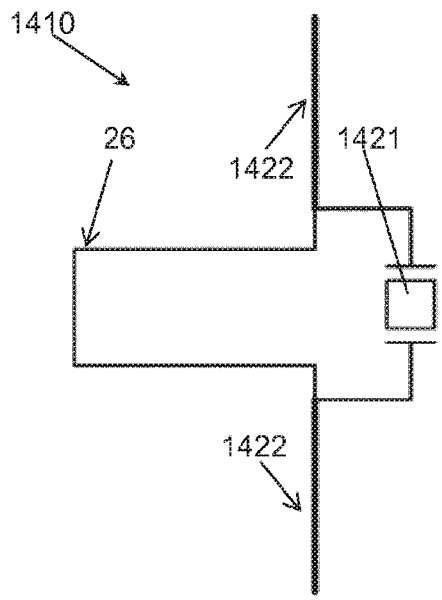
FIG.13    FIG.14
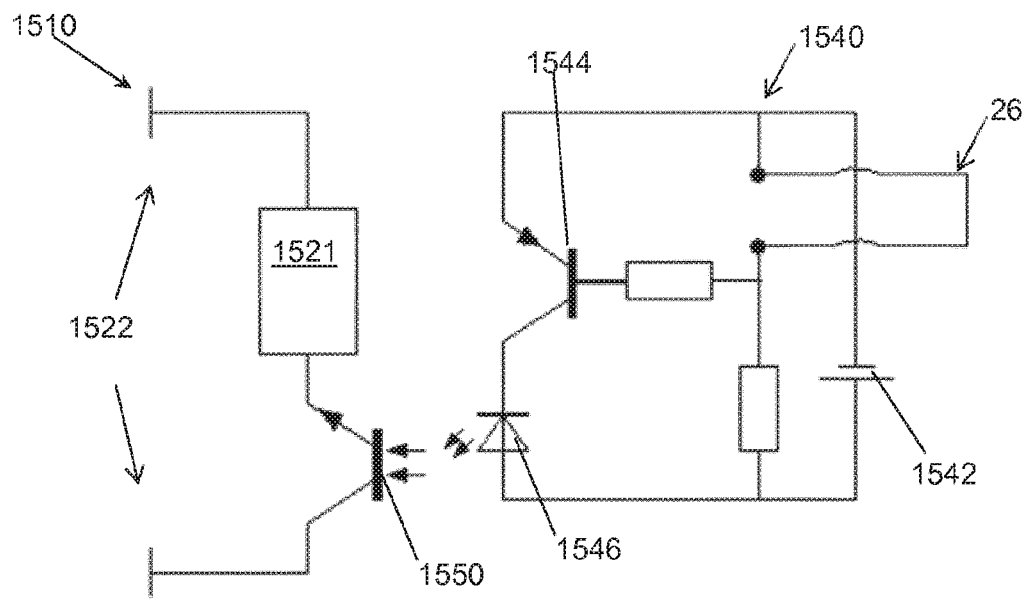
FIG.15

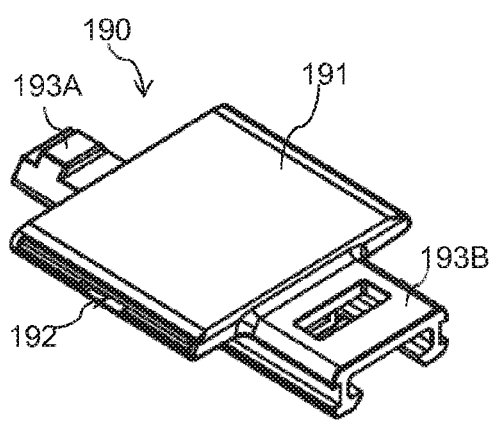
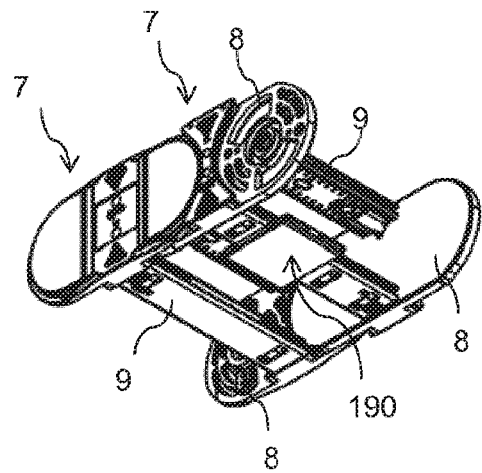
FIG.19A  FIG.19B
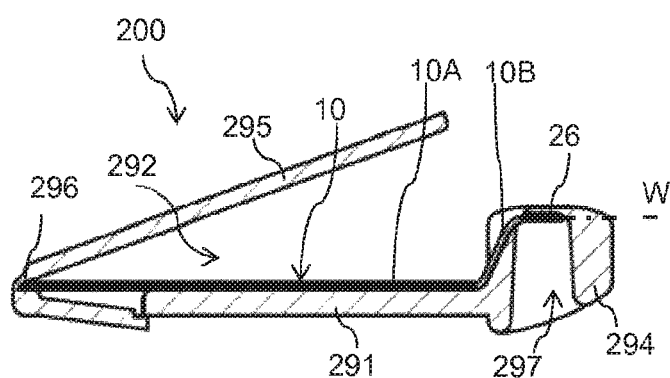
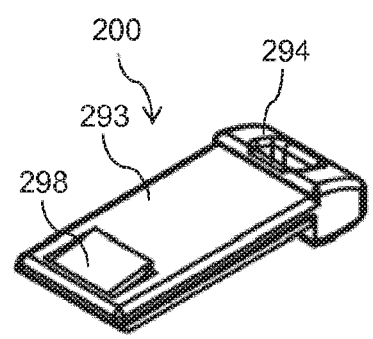
FIG.20A  FIG.20B
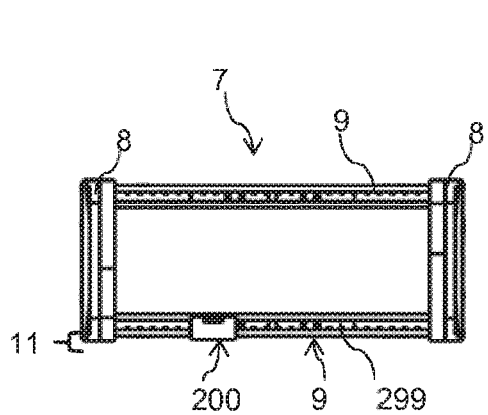
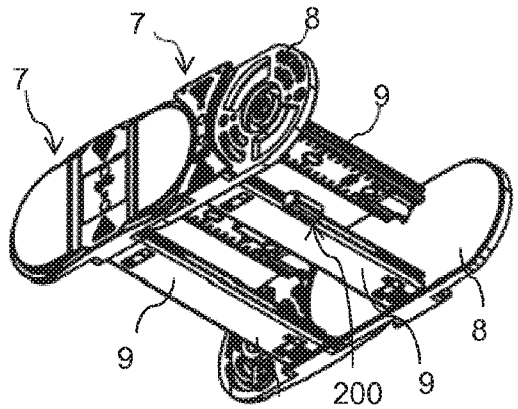
FIG.20C  FIG.20D

LINE GUIDE DEVICE WITH ELECTRICAL DETECTION OF DETERIORATION AND RADIO CIRCUIT FOR SAME

FIELD

The invention quite generally concerns active line guides having electrical detection of deterioration. It concerns in particular energy guiding chains of plastic or comparable line guide units of plastic. The invention also concerns a system, a method and a detection module for detection of deterioration.

The invention further concerns a radio circuit, in particular for detection of deterioration in relation to active line guides.

BACKGROUND

Dynamic line guides of the general kind set forth are known to serve for the protected guidance of at least one line between a fixed connecting point and a connecting point which is movable relative thereto. Typically, the line guides accommodate a plurality of different kinds of lines. A wide-spread example is so-called energy guiding chains.

Energy guiding chains comprise a number of chain link members having oppositely disposed side plates, of which at least some are connected together by way one or two transverse legs and which are typically held parallel to each other. In cross-section they thus form a passage for guiding cables, hoses or the like in the interior of the chain links. The adjacent chain links are respectively hingedly connected together in paired relationship in the longitudinal direction.

The individual chain links can be composed of a plurality of individual parts of plastic, as described for example in patents DE 3531066 C2 or EP 0 803 032 B1. The chain links can also be made in one piece. In a frequent embodiment the adjacent side plates are pivotably connected together by rotary joints, for example of the pin/bore type, and can thus be pivoted or angled relative to each other as far as a predetermined maximum angle.

In a further example of an energy guiding chain of the general kind set forth, consisting of plastic parts, the individual chain links are hingedly connected together by elastically flexible hinge elements, as disclosed in EP 1 381 792 B1.

In an alternative embodiment of line guides of the general kind set forth, instead of chain links which are hingedly connected together, segments which are made in one piece at least portion-wise can be flexibly connected together. Such line guiding units in which adjacent segments are flexibly connected together by a film hinge-like connection in the longitudinal direction and which can be angled relative to each other are previously known for example from patent applications WO 98/40645 A1 or WO 00/41284 A1 or also from U.S. Pat. No. 3,473,769. Such line guiding units which can be made entirely or in part in one piece from plastic are suitable in particular for less demanding applications involving short guidance lengths and/or for inexpensive manufacture in large-scale series.

In line guides of the general kind set forth, in particular energy guiding chains or energy guiding units which are in one piece in portion-wise manner, failure of the line guide can occur after the intended service life is exceeded by virtue of excessive wear or also in the case of incorrect use thereof. That even applies to line guides of high-grade plastics, although these can certainly have the longer service life than line guides with chain links of metal.

Typically, energy guiding chains and line guiding units are so designed that the hinged or flexible connection between the individual link members or segments is very durable and has a service life which goes beyond the expected service life of the other elements of the link members or segments. In other words, a breakage generally occurs within the chain link members before the connection breaks.

In the event of failure due to chain breakage there is the risk that the guided lines are damaged as they are no longer guided in sufficiently protected fashion. In addition, proper regular operation can also be negated by excessive deterioration wear, for example if excessively worn chain components hook together or become blocked.

There has therefore long been the desire in relation to line guides to monitor the line guide by means of suitable monitoring systems and to be able to detect a breakage of the line guide at an early time and to avoid it in good time.

A monitoring system is known from patent application WO 2004/090375 A1. In an embodiment forces acting at individual chain links are measured and monitored by means of sensors, in particular strain gauges. In that way it is possible at any event for a break in the energy guiding chain to be immediately detected. An alternative sensor configuration for such a monitoring system is previously known for example from patent application WO 2013/156607 A1.

A further system for detecting a break in an energy guiding chain is previously known from patent application WO 2015/118143 A1. In that case in the event of a chain break a tension cable is released so that the break in the energy guiding chain is first electromechanically detected. In many applications it is desirable for excessive wear to be already reliably detected in good time before the occurrence of a failure caused by a break in the line guide.

The above-mentioned systems are highly suited to triggering an emergency stop if a failure in the energy guiding chain or line guiding unit has occurred. It is possible in that way to avoid inter alia damage to the guided lines. In part the first-mentioned systems are capable of already indicating an impeding failure before a break occurs. The systems however are only limitedly suitable for that purpose, they are quite complicated and expensive in structure and they require in part considerable and expensive modifications to the design configuration of the line guide itself so that retro-fitment to existing line guides appears difficult.

For deterioration detection for example laid-open application DE 196 47 322 A1 discloses an energy guiding chain in which the chain links have a layer structure with two differently coloured plastics. If a first plastic layer is worn away then a second layer of a different colour becomes visible, which makes the fact that the permissible wear limit has been exceeded visually apparent to the user. Detection however is only possible in that way with continuous checking by operating personnel and is therefore not very reliable.

A development in this respect is proposed in laid-open application DE 103 46 486 A1. In an embodiment of DE 103 46 486 A1 which is considered as the most relevant state of the art the energy guiding chain is equipped with an electrical detection of deterioration. For that purpose the deterioration detection apparatus in an embodiment has a detector line which is guided at at least one chain link close to an outside surface or issues there so that a line portion in the critical region causes a line interruption. In principle that mode of operation could also be transferred to the detection of a fatigue break, for which purpose DE 103 46 486 A1 and EP 1 521 015 A2 in a further example (FIGS. 9 and 10) propose breakage detection.

SUMMARY

First Aspect

A first aspect of the present invention is accordingly to propose a structure for deterioration detection, which can also be implemented inexpensively in large-scale series or applications involving a multiplicity of active line guides. This solution is intended to permit fully automatic early detection along with minimum changes to the design configuration of existing line guides, for example in high-availability applications or so-called zero downtime applications.

Energy guiding chains of the general kind set forth have a number of chain links which form a passage for protectedly guiding one or more lines like cables, hoses or the like, between a first connection end and a second connection end which is moveable relative thereto, wherein adjacent chain links are hingedly connected together in the longitudinal direction. Also included in the scope of the invention are line guiding units which are produced in one piece over at least one longitudinal portion or completely, with segments corresponding functionally to chain links. The segments form a passage for protectedly guiding one or more lines. In that case adjacent segments are respectively flexibly connected together in the longitudinal direction, for example in the manner of a film hinge. In particular so-called band chains are considered as the line guiding units.

For both kinds of active and dynamic line guides there is proposed an apparatus for detecting wear deterioration in a critical region of at least one chain link or segment, which for the purposes of automation is based on an electrical operating principle. The term deterioration or wear is used in this case to denote generally any, in particular use-governed, mostly unwanted change in the line guide, in particular abrasion-induced wear, but also the formation of fine cracks and/or a fatigue break, for example because of material fatigue or overloading. Such cracks are generally then propagated and lead to the fatigue break.

According to an aspect of the invention to attain the first-mentioned object it is proposed that the apparatus has at least one transponder arranged at the at least one chain link or segment or at an adjacent other chain link or segment, and has for each respective transponder at least one detector element which cooperates with the transponder and which is arranged at the first-mentioned chain link or segment to be monitored.

The invention further provides that the detector element, with a predetermined amount of wear deterioration, in the critical region, changes the behaviour of the transponder so that this wear-induced change can be wirelessly detected.

Transponders suitable for this solution can be obtained at very low item costs. In the simplest case a resonance circuit or a short-circuited coil, tuned for example to an oscillating circuit, is sufficient in the case of inductive coupling as the transponder.

The solution according to the invention, by virtue of the wireless detection capability, on the one hand in combination with the arrangement of the transponder or transponders directly at or close to the monitored chain link, avoids the need for wiring up a large number of individual sensors, like for example in accordance with WO 2004/090375 A1. That reduces the material costs and the amount of work involved, in respectively equipping the line guide with the detection arrangement in application-specific fashion.

The predetermined amount of wear, in comparison with the new state, can be in particular an abrasion-related wear limit or a change in state which adversely affects the proper serviceability beyond an acceptable degree. The critical region can be an outer edge region of the line guide (in the new state), or it can adjoin same, or it can be in directly adjacent relationship in the direction of progressing wear. In principle the critical region includes a predetermined limit in respect of permissible wear, and partial regions in which deterioration is still to be viewed as non-critical or as already being critical. The critical region is to be provided at a wear-susceptible location.

Because a detector element changes substantially only the behaviour of the transponder in the event of a predetermined amount of wear in the critical region, so that this wear-induced change—for example in relation to a nominal behaviour—can be wirelessly detected, it is possible to provide an electrically highly simple and robust structure without pronounced sensor components. The invention is based inter alia on the simple realisation that to establish a critical degree of wear, measurement in the actual sense, that is to say quantitative detection of a given parameter, is not required.

Preferably each transponder has precisely one detector element or for each transponder a number n of detector elements is arranged at n adjacent chain links or segments, which possibly each act on the common transponder by way of a relatively short detector line. The number n however should remain as low as possible as otherwise this in turn involves wiring and circuitry expense. Detector lines can possibly be portion-wise accommodated by the line guide itself.

The change in the transponder behaviour which can be detected by a reading device or a transceiver can be implemented in many different ways, in particular as an electrically measurable parameter change. For example, a line interruption or a line short-circuit which influences, in particular adjusts or shuts down, the operational readiness of the transponder, can be particularly easily detected. For example, the circuitry topology can be modified by the critical wear, or an electrically measurable or functionally relevant parameter like for example the impedance values (AC resistance values) of a resonance circuit in the transponder and so forth can be altered. What is crucial for the principle involved is that the transponder as an indicator of deterioration detection exhibits a recognisably different behaviour when the permissible amount of wear deterioration is reached or exceeded, and that can be detected by radio or wirelessly. Thus, for example, a line interruption can bring about the change in behaviour by way of a detector line to the critical region or regions. It is also possible for example for a part of the transponder antenna itself to be exposed to the deterioration in the critical region.

An n:1 relationship with n detector elements per transponder is possible either for more reliable detection at the same segment or chain link or for monitoring up to n chain links or segments. In particular a transceiver which is capable of transmitting and receiving is to be considered as the reading device.

In an embodiment which can be easily retro-fitted the transponder and the cooperating detector element are integrated in a detection module which is designed in particular for mounting to a chain link or segment to be monitored. In that case the dimensions of the module are preferably markedly smaller than the side surface area of the chain link or segment. The detection module is so arranged at the at least one chain link to be monitored, that the detector element is in the critical region. For that purpose, the chain links or segments may have for example prefabricated receiving means or recesses.

In accordance with a further aspect which is independent of the first aspect the invention also concerns a detection module for equipping or retro-fitting a line guide with an electrical deterioration detection function, including a transponder whose behaviour, in particular its radio behaviour, can be altered due to wear.

In an embodiment which is particularly suitable for retrofitment the detection module includes a transponder having an antenna and a detector element, and a housing having fixing members cooperating with a known line guide in order to fix the detection module to the line guide. In that case the housing is of such a configuration that a region of the housing with the detector element is exposed to a region which is critical in respect of wear deterioration.

Preferably the fixing members are compatible with transverse legs or the connectors provided for same at side plates on the chain links in order to cooperate with same. The housing can be made in particular from plastic, for example as an injection moulding.

In a preferred embodiment there is provided a two-part radio circuit which includes the transponder and a rigid first circuit portion as well as a flexible second circuit portion, wherein the detector element is provided in the flexible second circuit portion to be able to position same in the housing and possibly selectively.

In an embodiment the module has a carrier or a housing having a separate region in which the detector element is disposed in the manner of an intended breaking point in order to change the behaviour of the transponder in the event of a break due to wear. The carrier can represent for example a flexible self-sticking adhesive label. For example, a resin casting of a conventional transponder with a use-adapted additional detector element can be considered as the housing. The module housing can also be cast jointly with a radio circuit by injection moulding, for example in the IMPS method (Integrated Metal Plastic Injection Moulding).

In an embodiment of both aspects the transponder and the cooperating detector element are integrated in a detection module, wherein the detection module can be or is arranged at the at least one chain link or segment to be monitored in such a way that the detector element lies in the predetermined critical region that is to be monitored.

In an embodiment a number of chain links or segments each have at least one detection module, preferably a detection module at each side plate, in a wear-susceptible longitudinal portion of the line guide. That allows reliable detection even when the situation involves difficulties in predicting the chain link or segment which is most susceptible to wear deterioration and/or in the case of a certain error rate in respect of the transponder, for example a certain false-positive or false-negative rate, with very inexpensive passive transponders.

The detection element preferably cooperates in circuitry relationship with the transponder. It can be connected as a separate component to the transponder so that the triggering behaviour can be selected as desired, or in the form of an existing component part of the transponder, which minimises manufacturing costs.

In a simple embodiment the detector element is in the form of a line portion of a detector line which extends in the critical region, for example similarly to an intended breaking point, exposed to the predetermined amount of wear, and is interrupted at the predetermined amount of wear. Depending on the respective circuit arrangement the interruption can prevent operational readiness of the transponder and/or first cause same or cause it again.

In a variant which adjusts or enables operational readiness in dependence on wear, that is to say so-to-speak switches on the transponder, the transponder has an antenna which in the new condition of the line guide is short-circuited by way of the detector element. This allows the detector element to be so designed that, at the predetermined amount of wear, it opens the short-circuit and thus enables the antenna function.

As an alternative thereto, the transponder can be taken out of operation if the detector element is in the form of a component part of the antenna itself, which so extends in the critical region that the antenna is interrupted or rendered non-functioning at the predetermined amount of wear.

In particular but not exclusively for transponder configurations which are passive or which are supplied self-sufficiently from the radio power it is advantageous if the antenna is in the form of an induction coil or includes an induction coil. Dipole antennas however are possible, in particular for higher frequency ranges, in which case such systems generally have active transponders with their own power supply.

Particularly in the case of passive transponders an induction coil as the antenna can be a component part of a resonance circuit in the transponder, which as an absorption circuit or oscillation absorber by resonance absorption causes a change, which is read by the reading device or transceiver, in the electromagnetic field on the resonance frequency. The frequency shift method is known for that purpose, in which the reading device varies the frequency over a range around the resonance frequency, that is to say "wobbles", in order to detect the frequency drop at resonance through the transponder. Corresponding transponder circuits, so-called EAS tags, which were originally developed for goods anti-theft devices, are described for example in the early patents U.S. Pat. No. 3,810,147 or 3,500,373. With such systems the transponders can be extremely inexpensively produced, for example in the form of adhesive labels, insofar as they substantially only consist of the resonance circuit with the induction coil and a capacitor. In addition, the reading devices in those systems consume little electric power.

Passive transponders, in particular so-called 1-bit-transponders or single-bit transponders, are suitable for large numbers of items, that is to say transponders which only communicate the information: "transponder in the working region: yes" and "transponder in the working region: no" (therefore 1-bit). In that respect the following fall to be considered in particular as transponder configurations:

transponders in the form of the above-mentioned RF (radio frequency)-LC-resonance circuits (so-called RF-systems, for example from Checkpoint Systems http://us.checkpointsystems.com/or Agon Systems: http://www.agon-systems.com), for example at 8.2 MHz fundamental frequency of the generator: they are very inexpensive and energy-efficient at short to medium range (remote coupling systems: up to some metres);

transponders for frequency multiplication in the microwave range, which produce harmonics at the generator frequency, typically in the microwave range, for example by means of a dipole antenna with a capacitance diode: they produce substantially no false detection or false alarms with a long range (long range systems, up to over 10 m);

transponders as frequency dividers in the long wave range, for example between about 90-140 kHz, with a microchip and an oscillating circuit coil: also with a low error rate;

transponders for an electromagnetic method (EM method) in the LF range up to about 22 kHz, which detect periodic change in magnetisation of a soft-magnetic metal: they are suitable for line guides with chain links made substantially from metal, but have a certain error rate (typically about 25-30%) and a short range (up to about 2 m);

transponders for the acoustomagnetic method (AM method) based on the principle of magnetostriction, for example at 58 kHz from Sensormatic (http://sensormatic.com): which have a medium to long range up to about 20 m with a low error rate but very high power consumption.

Passive transponders of the above-mentioned kinds can be switched off in particular by wear or rendered inoperative (for example unusable or completely destroyed), for example insofar as a functionally relevant component part is arranged as an intended breaking point in the critical region, to act as the detector element.

In the case of passive transponders with an appreciable error rate it is advantageous to construct a system having a number of redundant transponders. Redundancy makes it possible for excessive wear to be signaled only when a plurality of or all independent transponders do not provide any return signal. Thus, with a sufficiently independent arrangement, for example due to spatial variation, the false alarm risk (false-positive) can be reduced to a negligible probability.

As an alternative to passive single-bit transponders, in accordance with a further aspect the transponder can be in the form of a passive or active RFID transponder with a microchip which stores identification information or an identifier. In that case the transponder preferably has an antenna for wireless communication in the IFM band, which possibly means there is no need for regulatory approval even with high levels of transmission power for longer ranges.

Active RFID transponders permit longer ranges in terms of wireless monitoring, for example for line guides with a very long travel distance (>>2 m). In that case the power supply for the active RFID transponder or transponders can be implemented by way of a supply line guided in the line guide. Preferably a single double-wire line feeds possibly all active RFID transponders so that the wiring and manufacturing complication and expenditure remains manageable.

The identification information of a passive or active "gendering" RFID transponder can be interrogated by way of the reading device. Thus, for example, plausibility checking, locating of the chain link in question and/or identification of the line guide to be maintained can be made possible. With RFID systems consideration is given in particular to switching on the transponder only when the critical degree of deterioration wear is reached in order to minimise false alarms.

Independently of the selected transponder technology it may be desirable, for functional checking, in particular in the case of transponders which are to be switched on due to wear, to provide a further independent test transponder, preferably for the same frequency range, in a region that is to be monitored in the line guide, the behaviour of which preferably does not change due to wear and which is ready for operation in the new condition. The test or checking transponder should in that case not be exposed to wear, that is to say it is to be without a detector element, but otherwise is to be arranged as similarly as possible to the transponders for deterioration detection at the line guide in the radio range of the apparatus.

In terms of use in conventionally constructed energy guiding chains the transponder and the detector element, in particular integrated in a detection module, can be fixed to a side plate and/or to a transverse leg of the chain link. In that case chain links respectively have oppositely disposed side plates and at least some of the chain links have at least one transverse leg joining the side plates. In relation to the sliding upper run, the detector element can be mounted in particular at a wear-susceptible narrow side, that is to say at a small side of the side plate, that is perpendicular to the inner and outer side surfaces of the side plates and substantially parallel to the longitudinal direction of the chain.

With a modular structure the detection module can cooperate with a connector on the chain link or segment for mechanical fixing, for example it can be disposed in a receiving means in positively locking relationship and can possibly be secured with a closure means.

In a particularly simple and inexpensive embodiment the transponder is provided on a self-sticking adhesive label, preferably jointly with the detector element.

A more expensive embodiment is also included in the scope of the invention, in which a plurality of detector elements are respectively arranged individually in critical regions at one and the same chain link or segment or at different adjacent chain links or segments and cooperate with a common transponder, preferably an RFID transponder with a microchip. The microchip can include a plurality of inputs for connection of the individual detector elements and send information dependent on the state thereof as a change to the reading device. It is possible in that way to determine for example various stages in deterioration wear. The term microchip is used in the present case to denote any suitable integrated circuit which can be obtained or manufactured in a current SMD or THT package.

It is also in accordance with the invention that the detector element is not adversely affected itself by the wear, but as a transmitting device monitors an intended breaking point at the chain link or segment. For that purpose, the chain links or segments can each have in the critical region an intended breaking point which triggers the detector element at the predetermined amount of wear. In that case the detector element can be in the form of an electromechanical switching device, which possibly allows more specifically targeted adjustment of the wear limit, independently of the electrical component involved. Thus, for example, an identical detection module can be used irrespective of the structure of the chain links or segments, for a respective plurality of types of line guides.

An embodiment is particularly inexpensive in which the detector element is in the form of a passive circuit component or in the form of a conductor portion, for example as a conductor loop through the critical region with a turning point or turning portion at the wear limit. In that way the detector element itself can form a kind of intended breaking point in the critical region and can be connected as part of a detector line to the transponder.

Both in line guides having a lower run and an upper run which is in sliding relationship therewith, and also in line guides with a self-supporting upper run, only a limited longitudinal portion is generally exposed to the heaviest mechanical loading. The critical longitudinal portion is application-dependent and is generally in a range in respect of the upper run between a first point at a spacing from the entrainment member, for example approximately at about 1-30%, in particular 5-20%, of the total length, and a second point at a spacing from the entrainment member, which is in front of the direction-changing arc in relation to the shortest upper run, for example approximately at about 35-40%, in particular 40-45%, of the total length. In practice for example experience has shown that in the case of sliding line guides, that longitudinal portion is often the most heavily loaded, which in the event of a pressure loading or in a return movement of the entrainment member, last comes out of sliding contact with the lower run or "lifts off". Therefore, one or more transponders and/or detector elements cooperating therewith can desirably be arranged in that longitudinal portion of the upper run. Tests have shown that monitoring of a longitudinal portion of the upper run which, at the minimum length of the upper run, is between a first spacing from the entrainment member and a second spacing which is remote from the entrainment member and in front of the actual direction-changing arc, is suitable for many situations. That region can be for example from an about 1 m spacing to about 3-4 m spacing from the entrainment member. Other longitudinal portions with a transponder or transponders can also be considered, for example in the case of applications which particularly involve abrasion wear, a wear-susceptible portion which is arranged approximately centrally between the entrainment member and the direction-changing arc, when the entrainment member is extended to the maximum extent.

In accordance with a further independent aspect the invention also concerns a system for electrical detection of deterioration including a line guide having at least one transponder whose behaviour changes at a predetermined amount of deterioration wear, and a reading device wirelessly cooperating with the transponder, in particular having a transceiver circuit, for wireless monitoring of the transponder behaviour. Particularly when a multiplicity of transponders is involved, wireless monitoring avoids considerable circuitry cabling for the detection apparatus, which inter alia reduces the usable volume in the passage in the line guide and could adversely affect the application-specific configuration. Besides the actual automatic signalling of excessive wear, the system can have further helpful functions, for example:

- an emergency shutdown for stopping the machine, installation or the like that is supplied by the line guide;
- a data interface to a maintenance signalling system; and/or
- a data interface to a merchandise management system, for example for partly automatic or fully automatic ordering of a replacement line guide.

Second Aspect

In known systems for deterioration wear detection it is disadvantageous that under some circumstances reliable detection of the non-critical state (without critical wear) and the wear-critical state is not possible. Non-appearance of the transponder signal, besides wear, can have other causes, for example moving outside the range of the reading device, failure for other reasons and so forth.

Accordingly, an independent second object of the invention is to propose a radio circuit for state detection, in particular for detection of deterioration, which allows more reliable detection of the current condition or which at least permits functional checking of deterioration detection. The invention seeks to provide that this is preferably made possible with a small structural size, for example in space-saving fashion, and at low cost. In particular the invention also seeks to provide that it at the same time permits an antenna size which is adequate to ensure the range. The radio circuit is to be designed to be suitable in particular for detection of deterioration on energy guiding chains. It should be appropriately compact and inexpensive to manufacture.

That object is attained by a radio circuit. That radio circuit, however, is also suitable for dynamic line guides.

In the simplest embodiment the object is attained by a first transponder unit allowing function checking and a second transponder unit allowing actual detection of a change in state, wherein both are connected to the same antenna. Thus, only one common antenna is required for both transponder units, in an active structure which saves on space and cost.

For that purpose, in particular a detector line, in particular a short-circuit stub line or an open-ended stub line, can be connected to the second transponder unit, wherein the detector line in a spatially separate critical region has a detector region which at a predetermined change in state, in particular at a predetermined amount of wear, in the critical region, alters the behaviour of the second transponder unit so that this change can be wirelessly detected.

The transponder units can be in the form of integrated RFID circuits, in particular UHF RFID circuits. In that case the second RFID circuit can be conductively connected to the common antenna by way of a transmission line and the detector line can be in the form of a stub line. In this embodiment the detector region can cause a mismatch between the second RFID circuit and the antenna in relation to impedance or in relation to power transmission.

The mismatch can be essentially terminated by the detector region, upon the change in state, in particular with a predetermined amount of wear, being separated from the remaining stub line in the critical or susceptible region. That can first bring about in particular an adequate transmission power in respect of the second RFID circuit by way of the antenna. In that way a part of the stub line, which remains without a separated detector region, can substantially cause adaptation in relation to power transmission, in particular impedance matching, between the second RFID circuit and the antenna.

The transponder units can have structurally identical integrated RFID circuits, in particular UHF RFID circuits, with different, that is to say identifiable identifiers.

The detector line can act as a short-circuit stub line and, in dependence on the state of wear, involve either a mismatch or a match in relation to impedance or power transmission.

The proposed radio circuit can be used in particular in dynamic and active line guides, but also in other industrial areas of application.

Further Aspects

According to a further independent aspect the invention also concerns a method of electrically detecting deterioration in a critical region of a line guide, wherein the deterioration is caused in particular by abrasion, cracking, fatigue breakage and/or the like. In accordance with the invention the method is distinguished in that, at a predetermined degree of deterioration, the behaviour of a transponder arranged at the line guide changes. That change is wirelessly detected by way of a reading device or a transceiver, for example for triggering a maintenance message and/or an emergency stop or the like.

BRIEF DESCRIPTION OF THE DRAWINGS

Further desirable and preferred features of the invention will be apparent from the accompanying Figures, by reference to which preferred embodiments by way of example of the invention are described hereinafter without limitation in the generality of the foregoing description. In the Figures identical references denote elements which are of the same structure or the same function. In the drawing:

FIG. 4 shows a side view diagrammatically illustrating the principle of an energy guiding chain with self-supporting upper run and a further example of deterioration detection according to the invention;

FIG. 5 is a diagrammatic side view of a chain link for an energy guiding chain as shown in FIG. 4;

FIG. 13 shows a circuit diagram illustrating the principle of an RFID radio circuit with a UHF dipole antenna and a separating device for same;

FIG. 14 shows a circuit diagram illustrating the principle of an RFID radio circuit with a UHF dipole antenna having a detector element which changes the antenna parameters;

FIG. 15 shows a circuit diagram illustrating the principle of an RFID radio circuit with a UHF dipole antenna and a detector circuit;

FIGS. 19A-19B show a first embodiment of a detection module with radio circuit according to the invention for retro-fitting of a chain link of an energy guiding chain;

FIGS. 20A-20D show a second embodiment of a detection module with radio circuit according to the invention for retro-fitting of a chain link of an energy guiding chain; and FIGS. 21A-21B show an active line guide comprising a plurality of segments which are produced in one piece with deterioration detection according to the invention.

DETAILED DESCRIPTION

Figure 1:
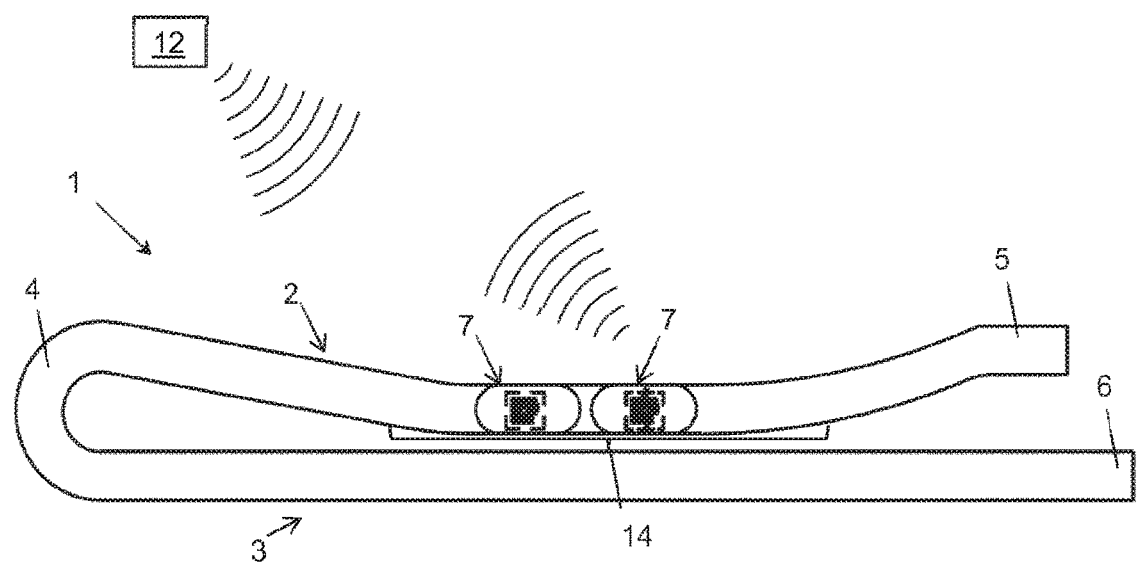
FIG. 1 shows a side view diagrammatically illustrating the principle of an energy guiding chain having an upper run sliding on the lower run and deterioration detection according to the invention.

FIG. 1 shows by way of example an energy guiding chain 1 whose upper run 2 slides on the lower run 3. In relation to a fixed point 6 of the energy guiding chain 1, from which a movable unit, assembly or the like (not shown) which is arranged at the reciprocatable entrainment member 5 is to be supplied, there is, depending on the respective application and dimensions, a critical chain portion 14 or possibly a plurality of such portions. Critical chain portions 14 can be determined empirically or will be apparent to the man skilled in the art in the planning procedure, for example from the loading weight, the minimum bending radius in the direction-changing arc 4, the overall length of the energy guiding chain 1, the speed of the entrainment member 5, and further application-dependent data. In particular the chain portion 14 of the upper run 2 which, depending on the respective position of the reciprocating entrainment member 5 or the direction-changing arc 4, slides predominantly on the lower run and is thus subjected to the most frictionally induced abrasion can be critical. The chain links 7 at any event are particularly wear-susceptible in the critical portion or portions 14.

To avoid an unwanted downtime of the machine, installation or the like (not shown) to be supplied a break in the energy guiding chain 1 or a line guided therein is to be avoided. That can be ensured by replacement in good time of excessively worn chain links 7 (FIG. 2B) or complete replacement of the worn-out energy guiding chain 1, for example at a scheduled stop, in the context of predictive maintenance.

Figures 2A, 2B:
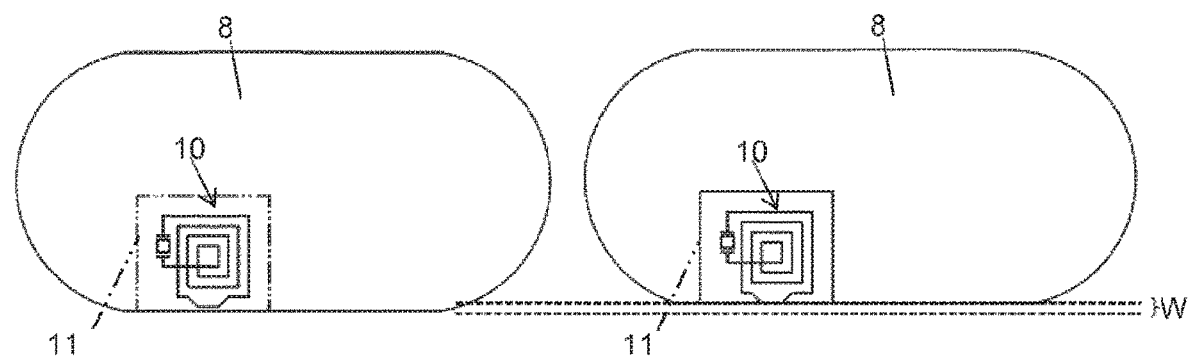
FIGS. 2A-2B show diagrammatic side views illustrating a chain link of the energy guiding chain of FIG. 1 in the new state (FIG. 2A) and in a critical deterioration state (FIG. 2B)

It is particularly desirable for the energy guiding chain 1 or its chain links 7 to be replaced precisely when the service life thereof is completely exhausted. For that purpose, selected or all chain links 7 of a critical chain portion 14 are respectively equipped with a radio circuit 10. Examples of radio circuits 10 will be seen in greater detail in FIGS. 2A-2B, and also FIG. 3, FIGS. 6-8 and FIGS. 11-12. The radio circuits 10 can have in particular RFID transponders and communicate wirelessly with a suitable radio transceiver, in particular an RFID reading device 12. In that respect the radio circuits 10 are disposed in critical regions 11 of the side plates 8 of the individual chain links 7 in such a way that, when a predetermined critical wear limit W (FIG. 2B) is reached, the radio behaviour of the radio circuit 10 changes. For example, when the wear limit W is reached or exceeded, the radio circuit 10 can send a different response signal to the RFID reading device 12, than in the non-critical operating state or in the new state (FIG. 2A). The predetermined wear limit W is established in such a way that, when it is reached or exceeded, the energy guiding chain 1 still reliably withstands a relatively low number of movement cycles, for example about 1% of the total life expectancy. It is only then that there can be a high risk of failure. The wear limit W is also application-dependent and can be determined by endurance tests on trial installations, model calculation and/or empirical values.

Figure 3:
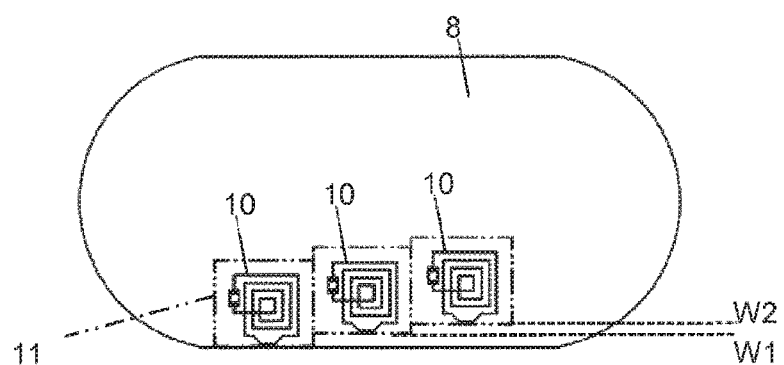
FIG. 3 is a diagrammatic side view showing a chain link with a second embodiment of deterioration detection according to the invention.

In accordance with a development as shown in FIG. 3 a plurality of independent radio circuits 10 can be provided at a single chain side plate 8 of a chain link 7. By suitable stepping or gradation of the radio circuits 10 in relation to advancing wear towards the wear limit W the individual radio circuits 10 change their radio behaviour in time-shifted mode in succession in accordance with the progressing wear. In that way it is not only possible to detect when a discrete critical wear limit W (see FIG. 2B) is exceeded, but also to achieve approximate recognition in relation to the wear state of a given chain link 7 wirelessly or in radio-based fashion by means of the RFID reading device 12. In addition, plausibility checking is made possible: if for example only one subordinate radio circuit 10 changes its behaviour without the preceding one in the graded arrangement having already signalled that, there is probably a fault which is not due to wear and which is to be checked upon regular maintenance.

If the wear limit W in the critical region 11 is exceeded in the case of the radio circuit 10 which is last in the direction of wear, as shown in FIG. 3, in this case too maintenance in good time will be implemented to avoid damage to the guided lines or failure of the machine, installation or the like which is supplied by the energy guiding chain 1.

Unlike the example shown in FIGS. 2A-2B an identification of the individual radio circuit is necessary for the arrangement shown in FIG. 3 for the purposes of association of the wear stage which has been exceeded. The functions shown in FIG. 3 are particularly easily implemented with RFID transponders which have a unique identification or an unmistakable identification number and which produce a return signal upon radio enquiry by the RFID reading device 12. For example, so-called RFID tags with a microchip are suitable for that purpose, which for example are designed in accordance with ISO 18000-1 and IEC 18000-6C and which send back a unique identification information to the RFID reading device 12. The predetermined association is stored in the RFID reading device 12 or a computer connected thereto.

FIGS. 4-5 show an alternative arrangement of an energy guiding chain 1 with electrical detection of deterioration in accordance with a further embodiment. The energy guiding chain 1 as shown in FIG. 4 is in the form of a self-supporting chain (the upper run 2 does not slide on the lower run 3). Depending on the laden weight and the stress on the energy guiding chain 1 such chains can also suffer from failure, for example if the life expectancy of the energy guiding chain 1 is exceeded. Typical abrasion wear phenomena in that case are fine progressing cracks 15 in the side plates 8 of the chain links 7, which ultimately could lead to a complete break in the chain link 7. In this case too it is possible to empirically determine a critical chain portion 14 in which the individual chain links 7 are at their most susceptible in regard to wear phenomena or the risk of a chain break is at its greatest.

Accordingly, for the application situation shown in FIG. 4 the critical region 11 is where experience has shown that cracks can most probably occur due to material fatigue in the side plate 8. Here too a radio circuit 10 is provided in the critical region 11, the transmission behaviour of which, in cooperating with for example an RFID reading device 12, changes upon the occurrence of cracks in the side plate 8. In the example shown in FIGS. 4-5 a connection of the radio circuit 10 to the material of the side plate 8 which is of as large a surface area as possible and durable is advantageous, and that can be particularly easily achieved by self-sticking RFID adhesive labels. In contrast to commercially usual RFID tags however this use does not require any carrier material for the adhesive label, that is as break-resistant or durable as possible. Rather, at least in the critical region 11, a carrier material that is susceptible to breakage is desirable for the radio circuit 10, in which case the critical region 11 can possibly be provided separately for the actual transponder or the carrier material overall is susceptible to fracture.

In the embodiments shown in FIG. 1 and FIGS. 2A-2B, or FIG. 1 and FIG. 3 as well as FIGS. 4-5, the radio circuits 10 themselves are respectively arranged directly in a critical region 11 of at least one chain link 7, preferably a plurality of chain links 7, in a critical chain portion 14 of the energy guiding chain 1. The critical chain portion or portions 14 are in that case ascertained empirically, for example by endurance tests in a test laboratory, and represent particularly wear-susceptible and/or fatigue-susceptible locations in the energy guiding chain 1 overall.

The principle of wireless wear detection by means of radio circuits 10 can be applied to the detection of deterioration or wear due to friction-induced abrasion, due to operation of the energy guiding chain 1, like for example in the case of sliding energy guiding chains 1 (FIG. 1). The principle can equally be applied to the detection of cracking in the side plates 8 of selected chain links 7, which can occur when the nominal service life of the energy guiding chain 1 is exceeded, caused by aging, due to material fatigue, or possibly also before the life expectancy is reached, due to inappropriate stressing.

For detection of deterioration, it is provided that the radio circuit 10 changes its transmission behaviour in conjunction with a transceiver, for example with the RFID reading device 12, by virtue of mechanical stressing, but only when a state of critical wear is reached at the associated chain link 7. The degree of wear at which the change that can be detected by means of the radio circuit 10 occurs is so selected for example by positioning that a critical deterioration is signalled before complete breakage or failure of the energy guiding chain 1 occurs.

Figure 6:
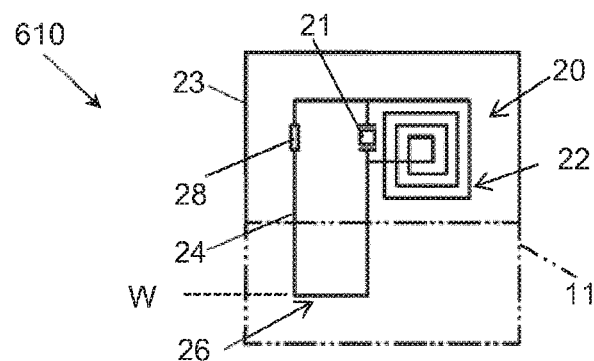
FIGS. 6-8 show schematic circuit diagrams illustrating the principle of RFID radio circuits by way of example for wireless detection of a predetermined wear in a wear-susceptible region.
Figure 7:
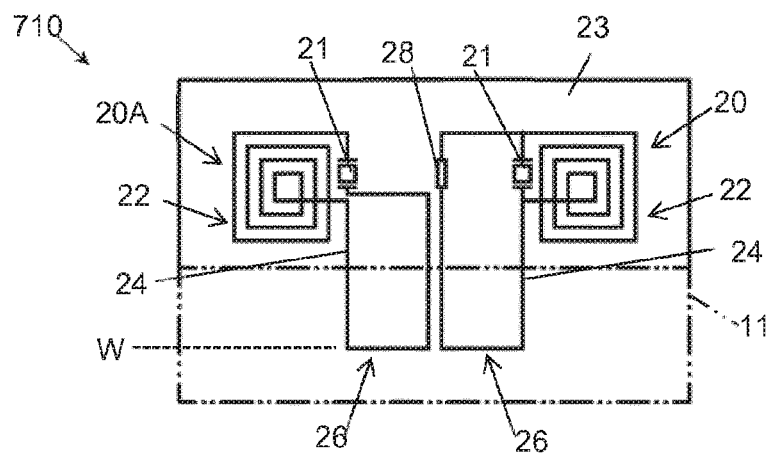
Figure 8:
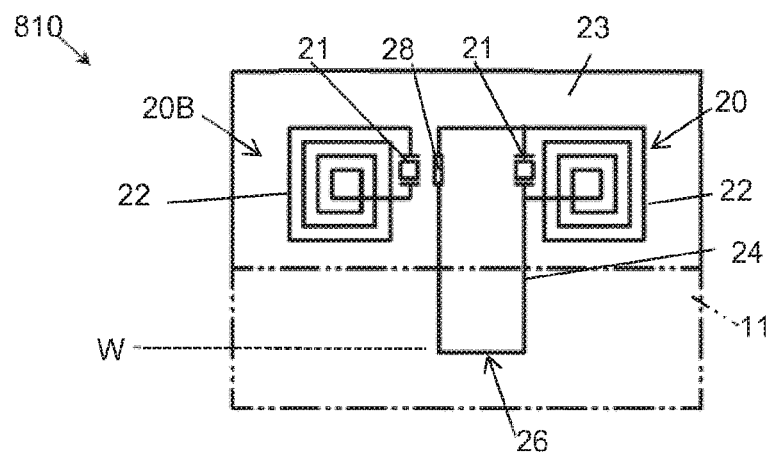

FIGS. 6-8 show possible embodiments of radio circuits 610, 710, 810, in particular for the situation of use shown in FIG. 1, in which respect only the structure and function thereof will be discussed hereinafter.

The radio circuits 610, 710, 810 are in the form of passive RFID transponders for wireless communication in the UHF frequency range of the IFM band. To provide manufacture which is as inexpensive as possible the RFID transponders 20 or 20A-20B shown in FIGS. 6-8 respectively include a commercially usual RFID microchip 21, shown here schematically as a resonator symbol, with an RFID antenna 22 matching same.

The RFID microchip 21 has a memory with identification information and is respectively supplied by way of the RFID antenna 22 by the transmission power of the RFID reading device 12. The RFID transponders 20 and 20A-20B shown in FIGS. 6-8 are passive and do not have their own power source or separate power supply.

In FIG. 6 the terminals of the RFID microchip 21 to the RFID antenna 22 are bridged over or "short-circuited" by means of a detector line 24, that is to say mismatched at any event in terms of impedance. A line portion 26 of the detector line 24 is passed in the form of a conductor loop in the critical region 11 in such a way that as a detector element 26 it breaks when the wear limit is exceeded, that is to say the detector line 24 is interrupted. This means that the regular supply for the RFID microchip 21, by means of the RFID antenna 22, is only enabled when the critical wear limit W is exceeded. In other words, the RFID transponder 20 of the radio circuit 610 is only ready to transmit when the wear limit W to be detected is reached or exceeded. To avoid damage caused by induction the detector line 24 can be provided with a low-ohmic shunt resistor 28. The actual RFID transponder 20 as well as the detector line 24 with its component parts can be fixed as a detection module on the same carrier 23, for example a fragile adhesive label, or for example can be cast in a brittle, fracture-sensitive material.

It is therefore for example only the interruption that can cause adequate impedance matching or elimination of a deliberate mismatch. The change in impedance due to wear can therefore also change or determine the behaviour of the transponder.

FIG. 7 shows a development of the principle shown in FIG. 6 and includes two RFID transponders 20; 20A. The transponder 20A functions in accordance with the reverse principle in comparison with the transponder 20. In the case of the transponder 20A the supply for the RFID microchip 21 is not enabled but is interrupted in the case of a break in the detector element 26 at the detector line 24. The structure of the RFID transponder 20 in turn is identical to the transponder 20 in FIG. 6.

A higher level of detection reliability can be achieved by the combination shown in FIG. 7 insofar as, when the proper signal from the RFID transponder 20A is received and the signal from the RFID transponder 20 fails to appear it is possible to conclude that the arrangement is in a state of readiness for operation without excessive wear. Conversely however the occurrence of the signal of the RFID transponder 20 and the non-appearance of the signal of the RFID transponder 20A signals with a higher degree of reliability that the wear limit W is exceeded in the critical region 11 insofar as two independent line portions as detector elements 20 were interrupted caused by wear. Here too identification information for pairing the RFID transponders 20A, 20 and the association thereof with the chain link in question are stored.

In a FIG. 7 variant which is not shown—similarly to FIG. 3—the detector element 26 of the one transponder 20A, in comparison with the detector element 26 of the other transponder 20, is displaced in graded relationship with respect to the wear limit W in order to obtain additional information relating to the wear and/or for checking purposes.

FIG. 8 shows a further embodiment having two RFID transponders 20; 20B, wherein a test transponder 20B is provided only for checking purposes as a long-term trial and its transmitting behaviour does not change in dependence on wear or deterioration. The other RFID transponder 20 is of identical structure or involves the same principle as the transponder 20 of FIGS. 6-7. In a FIG. 8 variant which is not shown—similarly to FIG. 3—the test transponder 20B can be arranged with a part of its antenna as the intended breaking point in the critical region 11 so that it is possible to detect a further wear limit, for example for an emergency stop.

Figure 9A:
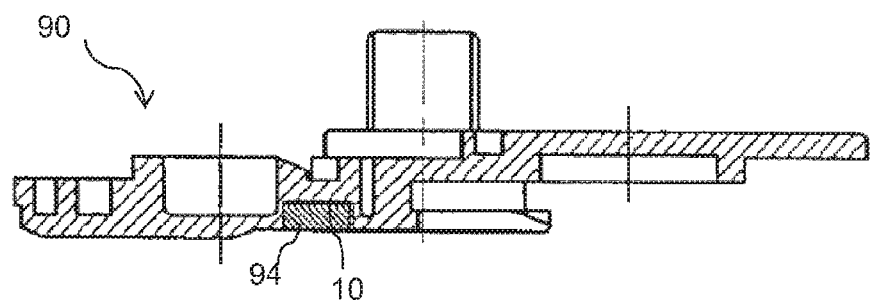
FIGS. 9A-9B show a view in longitudinal section of a side plate for a multi-part chain link, with a recess in a critical region for receiving a radio circuit.
Figure 9B:
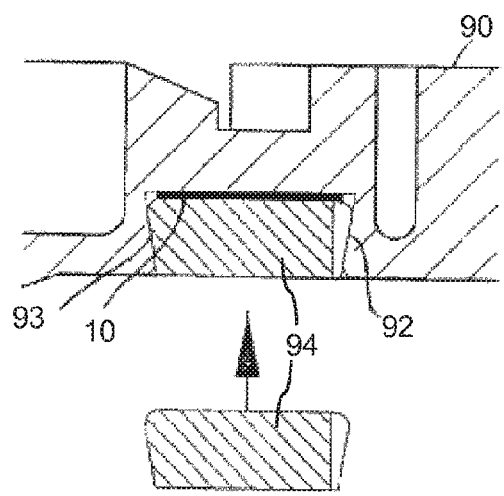

FIGS. 9A-9B show a possible option for arranging a radio circuit 10 in protected relationship in the side plate 90 of a chain link 7 of a multi-part structure. Only the differences relevant to the previously known structure of the side plate 90 are discussed here. Provided at the outer side surface of the chain side plate 90 is a recess 92 having an outwardly tapered contour with inclinedly extending side walls 93, the base surface of which is sized to accommodate the radio circuit 10. In this case the recess 92 is provided in the critical region 11 of the side plate 90, for example at the narrow side of the side plate 90 which is susceptible to abrasion and which is towards the axis of the direction-changing movement. After the radio circuit 10 is fitted the recess 92 is closed by means of a suitable closure element 94. The closure element 94 is held in positively locking and prestressed relationship by the inclined side walls 93 of the recess 92 so that the position of the radio circuit 10 is invariably fixed. With that arrangement for example a radio circuit 10 can be used in a housing which is susceptible to breakage, in operationally reliable fashion to act as a detection module. The radio circuit can also be integrated into the closure element 94. On chain links without the radio circuit 10 the recesses 92 can remain open or can be closed with further closure elements to avoid troublesome edges.

Figure 10:
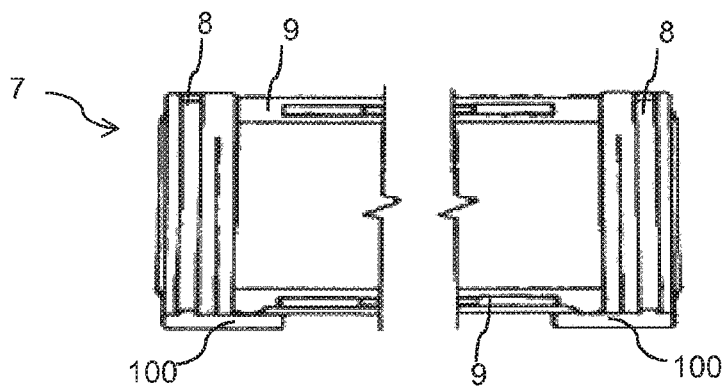
FIG. 10 is a view in cross-section of a chain link with slide shoes for receiving a radio circuit, for example as shown in FIG. 6, 7 or 8.

FIG. 10 shows a further embodiment relating to the arrangement of radio circuits 10 by means of a diagrammatic cross-section of a chain link 7. The two side plates 8 of the chain link 7 are connected together by way of transverse legs 9 and thus form the internal space for accommodating the guided lines. Fixed to the wear-susceptible narrow side of both side plates 8 and/or to the wear-side transverse leg 9 are slide shoes 100 which can be retro-fitted as detection modules, in which the radio circuit 10 (not shown in FIG. 10) is cast, for example in the IMKS method (integrated metal plastic injection moulding) or using multi-component injection moulding, or is fixed in intimately bonded relationship by gluing.

The structure shown in FIG. 10 permits retro-fitment as required on energy guiding chains 1 depending on the respective position of the critical chain portions 14 and the structure of the deterioration detection action according to the invention using the building block principle without adversely affecting the actual configuration of the chain links 7.

Suitable systems and methods for radio-based detection of transponders are known to the man skilled in the art from the literature in the art and relevant standards (for example ISO 18000-1 and IEC 18000-6C or the like) and are therefore not described in greater detail here.

Figure 11:
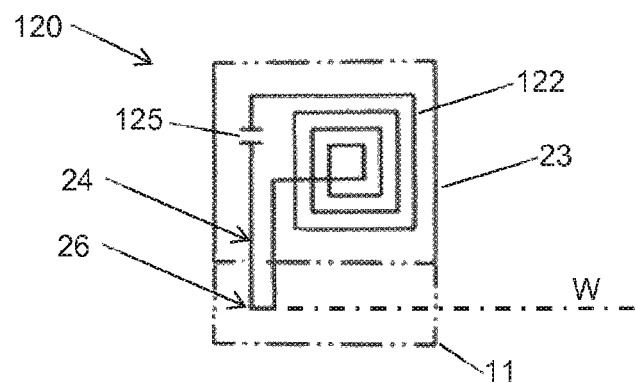
FIG. 11 is a circuit diagram showing the principle of a particularly simple passive RF radio circuit in the form of an LC oscillating circuit for wireless detection of predetermined wear.

FIG. 11 shows a particularly simple radio circuit in the form of an RF transponder 120, wherein an LC oscillating circuit which is known for merchandise surveillance (EAS: electronic article surveillance) was modified for example by a detector line 24 forming a loop in the critical region 11, which serves as the detector element 26. In the state of being ready for operation the oscillating circuit takes from the RF induction antenna 122 and the RF capacitor 125 an external electromagnetic HF field which is tuned to its resonance frequency—typically around 8.2 MHz—transmission energy and can thus be detected. To alter the behaviour of the RF transponder 120 the detector element 26 interrupts the connection between the RF induction antenna 122 and the RF capacitor 125 when the degree of wear exceeds the wear limit W. In that way the oscillating circuit becomes inoperative and the RF transponder 120 can no longer be detected at the resonance frequency. In particular a special manufacture of an adhesive label is adopted as the carrier 23, which includes a critical region 11 which is susceptible to breakage as the substrate for the conductor loop forming the detector element 26. The other features of the RF transponder 120 can correspond to the teachings from U.S. Pat. No. 3,810,147 or 3,500,373. The particularly inexpensive structure shown in FIG. 11 is advantageous in particular when very high numbers of items are involved.

Figure 12:
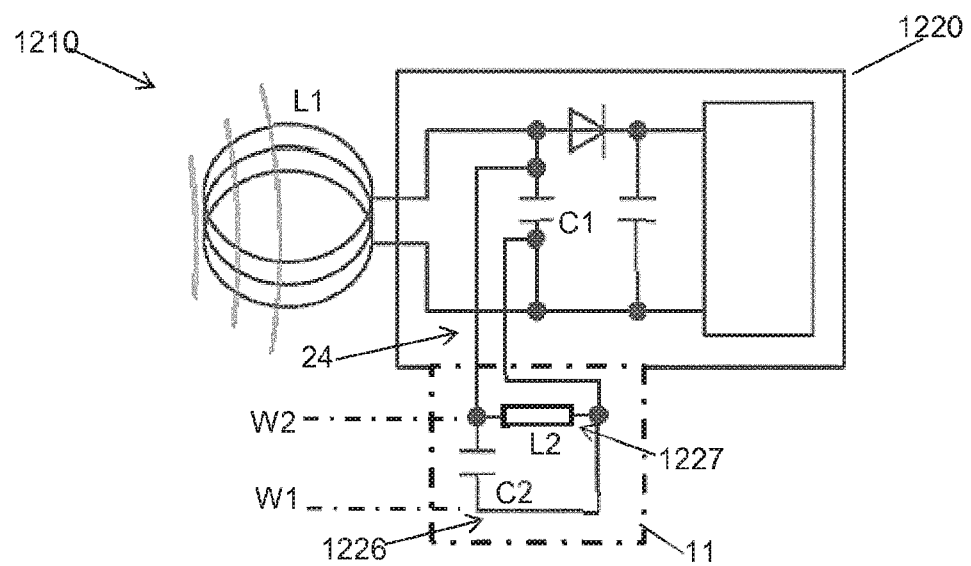
FIG. 12 is a circuit diagram illustrating the principle of a further radio circuit which is ready for operation in the new condition, which is not ready for operation when a first wear limit is exceeded, and which is again ready for operation when a second wear limit is exceeded.

FIG. 12 shows a development of the RFID circuits of FIGS. 6-8, to the effect that the radio circuit 1210 shown in FIG. 12 is ready for operation in the new state, but it is not ready for operation when a first wear limit W1 is exceeded, and it is again ready for operation when a second wear limit W2 is exceeded. To change the radio circuit behaviour connected to the detector line is a conductor having a parallel circuit of an interference capacitor C2 and an interference coil L2. Acting as the first detector element 1226 is a conductor loop in series with the capacitor C2, which uncouples the capacitor C2 if the wear exceeds the first wear limit W1. The interference coil itself acts as the second detector element 1227, being destroyed by abrasive friction at the wear limit W2.

The parallel circuit with L2 and C2 at the detector line 24, by virtue of a low impedance of C2, initially only immaterially adversely affects the resonance circuit so that the RFID transponder 1220 in the unimpaired new state is substantially ready for operation and receives power to supply the RFID chip at the resonance frequency. After separation of the parallel connection in respect of the capacitor C2 only the coil L2 is still acting. Its impedance is so selected that the resonance circuit is detuned with the resonance capacitor C1 and the resonance coil (antenna) L1, serving as the antenna, and no longer resonantly responds in the frequency range of the reading device (FIG. 1). Accordingly, the RFID transponder 1220 is inoperable in relation to the reading device. In that respect the following applies for the values of the impedances: (a) $C2 \ll C1$ and (b) $L2 \ll L1*(C1/C2)$. If the wear reaches the second wear limit W2 the interference coil L2 becomes inoperative and therefore the detuning of the oscillation damper is removed again. In that way the RFID transponder 1220 is again properly capable of operating.

A detector arrangement with multi-step gradation as in FIG. 3 or FIG. 12 has the advantage that at the beginning the system allows a functional test and can be configured above all fully automatically, insofar as it automatically receives the identification information of all present radio circuits 1210. If the return of a previously detected item of identification information fails in later operation then it is to be concluded that a wear limit has been exceeded.

FIG. 12 has the further advantage that—without multiplying the radio circuits 1210—it is possible to start reliably from a super-critical wear if the identification information in question is detected afresh again after a certain period of time. Preferably an emergency stop is triggered as the worn line guide was not yet renewed or repaired.

FIGS. 13-15 show further embodiments of radio circuits 1310; 1410; 1510 for RFID-ICs with dipole antennas for the UHF frequency range, for example in accordance with ISO 18000-6C. They afford inter alia a greater range than LF or RF radio circuits (for example as shown in FIGS. 6-8 or FIG. 11) and can also be inexpensively produced as passive detection modules. The mode of operation and the arrangement on the line guide corresponds for example to one of the above examples.

In the radio circuit 1310 in FIG. 13 a dipole antenna 1322 can be switched by way of a special IC 1330 (integrated circuit), for example an ASIC, in such a way that it can be galvanically separated from the RFID circuit 1321 or connected thereto, in the manner of a switching relay. For that purpose the IC 1330 has a transistor arrangement which connects both nodes of the dipole antenna 1322 when a conductor loop used as the detector element 1326 is separated. The detector element 1326 is connected to terminals of the IC 1330, which control the relay-like transistor arrangement. The RFID circuit 1321 can be in the form of an integrated component part of the IC 1330. The radio circuit 1310 can be active, that is to say it can be connected to a power supply, or it can also be powered passively by way of the dipole antenna 1322 from the radio power.

In FIG. 14 a dipole antenna 1422 is bridged with a conductor loop used as the detector element 26. As a result, the power parameters of the dipole antenna 1422 are measurably influenced so that separation of the detector element 26 by wear can be detected by means of a suitable reading device (see FIG. 1 or FIG. 4). In the UHV frequency range a "short-circuit" (unlike the situation with an induction antenna as shown in FIG. 6) does not necessarily lead to absence of the radio signal, but to a detectable parameter change in the radio behaviour, which the RFID chip 1421 with the dipole antenna 1422 causes. The radio circuit 1420 shown in FIG. 13 is suitable as a purely passive system.

In the radio circuit 1510 shown in FIG. 15 a dipole antenna 1522 is also connected to an RFID chip 1521. An active detector circuit 1540 having a voltage source 1542 here too includes as the detector element 26 a conductor loop which can be separated by wear, by virtue of the arrangement thereof in a wear-critical region. If the detector element 26 is divided the pnp transistor 1544 switches to the forward direction so that the LED 1546 produces light and switches the NPN phototransistor 1540 in the manner of an optocoupler so that the dipole antenna 1522 is connected in low-ohmic relationship to both terminals of the RFID chip 1521. It is also possible for that purpose to use a conventional optocoupler. Upon an interruption in the detector element 26 the detector circuit 1540 thus enables the connection of the dipole antenna 1522 to the RFID chip 1521, that is to say it puts the RFID chip 1521 in the operationally ready condition. The radio circuit 1510 is suitable as an active system, in which case the voltage source 1542 can also power the RFID chip 1521 (not shown).

Finally, it is to be noted that RFID transponders with IC and information memories, unlike 1-bit transponders (see FIG. 11) permit more intelligent systems which inter alia allow determination of the energy guiding chain 1 in question in more complex installations, closer locating of the worn chain link and for example also the use of a plurality of detector elements on an RFID chip (not shown), for example for more reliable detection.

Figure 16:
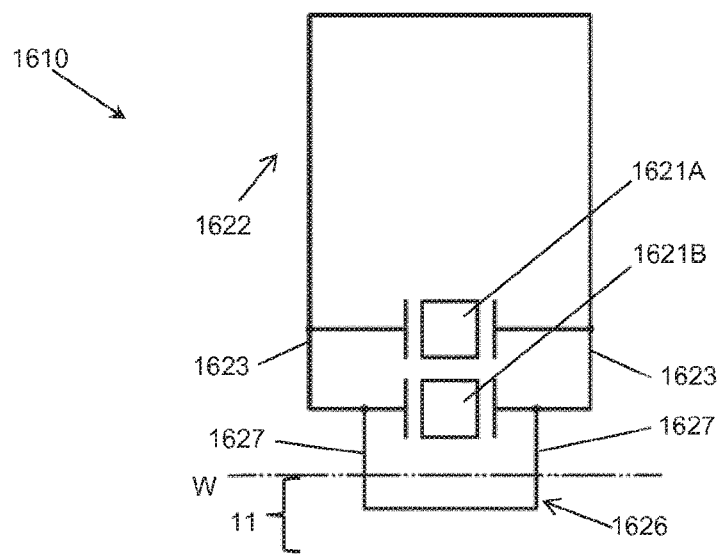
FIG. 16 shows a circuit diagram illustrating the principle of an embodiment with RFID radio circuits, which allows function testing.
Figure 17:
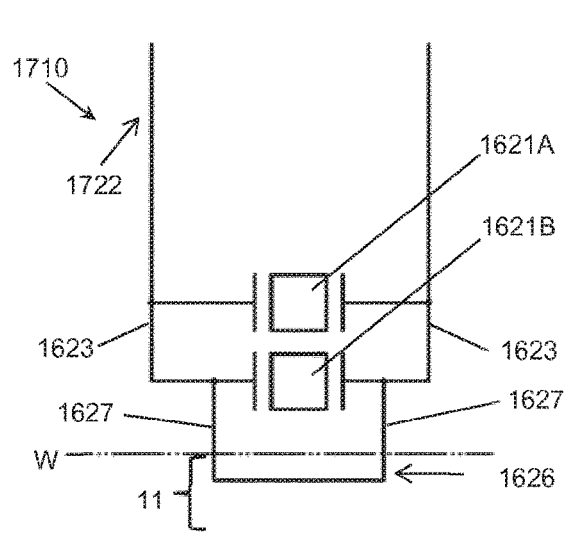
FIG. 17 shows a circuit diagram illustrating the principle of a second embodiment of RFID radio circuits for function testing.
Figure 18:
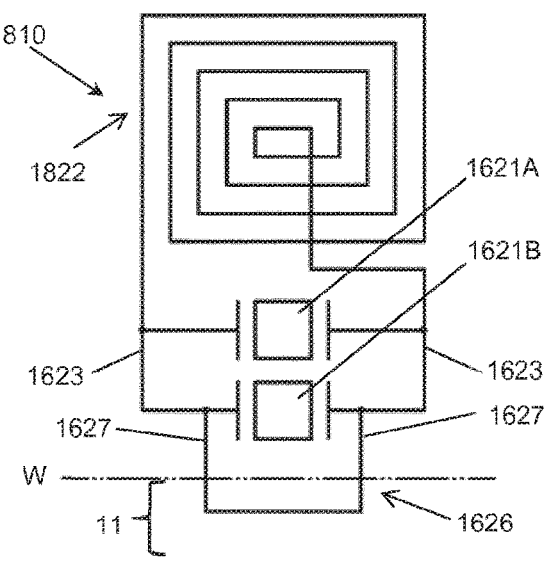
FIG. 18 shows a circuit diagram illustrating the principle of a third embodiment of RFID radio circuits for function testing.

FIGS. 16-18 show a development of the principle of FIGS. 6-8. A higher degree of detection reliability can be achieved by an arrangement as shown in FIGS. 16-18, insofar as when a proper signal is received from a first RFID transponder and the signal from a second RFID transponder does not appear it is possible to conclude that the situation involves a state of readiness for operation without excessive wear.

Conversely however the occurrence of the signal from the second RFID transponder (with or without the signal from the first RFID transponder failing to appear) signals with a higher level of reliability that the wear limit W is exceeded in the critical region 11 (FIGS. 1-8).

FIGS. 16-18 show three further embodiments of radio circuits 1610; 1710; 1810; which differ from the foregoing examples in particular in that the transponder in each embodiment respectively has two RFID chips 1621A, 1621B which are both connected to a single common antenna 1622; 1722; 1822.

In the radio circuits 1610; 1710; 1810 firstly only the first RFID chip 1621A is ready to receive and transmit in the new condition and up to the critical wear value, for example when the wear limit W is exceeded. It is only when the detector element 1626 is divided or removed by excessive wear, for example because of mechanical abrasion beyond the wear limit W, that the second RFID chip 1621B is also practically ready to receive and transmit. The RFID chips 1621A, 1621B can be of the same kind, the identifiers or identification information in respect of the RFID chips 1621A, 1621B however differ from each other. Thus, the first RFID chip 1621A firstly allows functional testing of the radio circuits 1610; 1710; 1810 for example to check whether wear detection is provided and/or is ready for operation. That check is affected on the basis of the previously known identifier of the first RFID chip 1621A. That is received by the reading device and is stored for example in a database. That first identification can also be used in another way, for example for logistic purposes or for detection of the system configuration.

The first RFID chip 1621A can be connected conductingly (galvanically) or inductively to the antenna 1622; 1722 or 1822 respectively. The radio circuits 1610; 1710 and 1810 respectively can be implemented in particular in the form of PCBs or FPCs, the antennas 1622; 1722 and 1822 respectively being in the form of conductor tracks. The RFID chips 1621A, 1621B are preferably of the same structure to simplify the system, for example suitable commercially usual integrated circuits (ICs), preferably in SMD or for SMT technology.

The second RFID chip 1621B is conductively connected in FIGS. 16-18 to the common antenna 1622; 1722 and 1822 respectively by way of a transmission line 1623. For the change in the radio behaviour of the second RFID chip 1621B due to wear, a blind line or stub line 1627 is conductively connected in parallel to the transmission line 1623. The stub line 1627 serves as a detector line and in the illustrated example is in the form of a double-wire line, for example similarly to a so-called "single shunt stub tuner", and is short-circuited by way of a conductor portion in the critical region 11 (SC-stub line). That conductor portion in the critical region 11 forms the detector element 1626, as shown in FIGS. 16-18. The stub line 1627 can alternatively be open or open-ended (the open-ended stub line is not shown), but with conductor portions which are exposed in the critical region 11 and which are separated in the event of excessive wear beyond the wear limit W, thereby serving as the detector element 1626. Although the structure shown in FIGS. 16-18 is simple to implement, for example a double stub line (similar to the so-called "double shunt stub tuner") or a pronounced matching network is also in accordance with the invention for example to minimise any influencing of the first RFID chip 1621A.

The conductor track dimensions of the portion forming the detector element 1626 and the conductor track dimensions of the conductor track portions of the stub line 1627, that remain after excessive wear, are in this arrangement set in a predetermined ratio. The adjustment is affected on the one hand in such a way that in the new condition sufficient mismatching, in particular impedance mismatching, so severely disturbs the receiving and transmitting readiness of the second RFID chip 1621B that it cannot effectively communicate with the reading device. In particular the stub line 1627 with the detector element 1626 can specifically worsen the passive power supply and/or transmitting power of the RFID chip 1621B to a sufficient degree. On the other hand, the ratio can also be so set that, after separation of the detector element 1626, there is adequate matching, in particular impedance matching, in respect of the transmission line 1623 connecting the antenna 1622; 1722 and 1822 respectively to the second RFID chip 1621B. In the state without the detector element 1626 or without a conducting connection in relation thereto, the stub line 1627 can lead in particular to substantial power matching or impedance matching in relation to the additional transmission line 1623 at the second RFID chip 1621B. The position of the connecting point of the stub line 1627 to the transmission line 1623 itself can also be set as a further parameter, in accordance with those factors. The deterioration-dependent change in impedance matching is affected in that case in relation to the additional transmission line 1623 between the antenna 1622; 1722; 1822 and the second RFID chip 1621B. The absolute line lengths of the stub line 1627 and the detector element 1626 are adjustable over a certain range because the ratios are repeated substantially periodically with half the operating wavelength ($\lambda$). An increase in length by $n*\lambda/2$ (with n being an integer) is possible with the behaviour remaining substantially the same.

Without tying the invention down to a given theory the reflection at the connecting point of the stub line 1627 in relation to the first RFID chip 1621A can be so adjusted by a suitable choice of the overall length of the transmission line 1623 and the position of the connecting point thereof to the stub line 1627 that the transmission behaviour of the first RFID chip 1621A is not relevantly impaired by the change in state due to the deterioration so that for example the range or transmission power of the first RFID chip 1621A changes only immaterially in the new state and in the critical wear state. Irrespective thereof (similarly to the principle shown in FIG. 7) it can alternatively be provided that, with a critical deterioration wear, the second RFID chip 1621B becomes ready to receive and transmit, and the first RFID chip 1621A practically drops out, which also allow functional checking in the non-critical state.

In the event of deterioration wear near to or at the wear limit W the second RFID chip 1621B becomes ready to receive and transmit because of the matching which occurs, caused by the disappearance of the disturbance or mismatching by virtue of the detector element 1626. Accordingly, the reading device can then receive the further identification of the second RFID chip 1621B, which makes it possible to arrive at the conclusion of critical wear. The previously known identification of the second RFID chip 1621B can also be stored for that purpose, for example in a database.

The detector element 1626 is arranged in a region spatially separate from the RFID chips 1621A, 1621B and the common antenna 1610; 1710 and 1810 respectively, for example at an end opposite to the antenna 1610; 1710 and 1810 respectively of the PCB or FCB and optionally at the rear side.

The embodiments shown in FIGS. 16-18 are suitable in particular for transponders or RFID chips 1621A, 1621B in the high frequency range, for example at UHF, in particular for UHF-RFID, for example with a fundamental frequency of 865 MHz to 955 MHz or 2.4 GHz (with wavelengths in the decimetre range). The principle of the change caused by deterioration in line matching at the fundamental frequency as a detection principle can be similarly transferred to an embodiment as shown in FIGS. 6-8. With open-ended or short-circuited stub lines of suitably selected length, inductive or capacitive reactances can basically be adjusted virtually from zero to infinite. Impedance mismatching or optional matching is affected in that case in particular by the suitable adjustment of the reactance by means of the detector line, for example by the short-circuit stub line 1627. The dimensioning of the conductor track dimensions of the detector element 1626 and the stub line 1627 and determining the connection point can be implemented for example by means of the Smith chart in per se known manner.

The radio circuits 1610; 1710; 1810 shown in FIGS. 16-18 differ from each other in the kind of antenna used. The radio circuit 1610 in FIG. 16 has a loop dipole antenna 1622, while the radio circuit 1710 in FIG. 17 has a dipole antenna 1722. The latter afford a space-saving structure. The radio circuit 1810 in FIG. 18 has an antenna coil 1822 for a possibly greater range. The antennas 1622; 1722; 1822 are respectively sized to suit the selected fundamental frequency or the selected RFID chips 1621A, 1621B.

Besides a pure stub line 1627 as the detector line, that is to say impedance matching of the conductor type, matching circuits with discrete components are also considered, for example an impedance matching network of L-type, n-type or P-type.

The detector line with the detector element 1626, as a separation or filter circuit, can also filter out the high frequency (HF) signals in the operating band of the RFID chips 1621A, 1621B. That can be affected, for example, in accordance with the principle of a series resonance circuit in relation to earth, an open quarter-wavelength stub line or a short-circuited half-wavelength stub line, wherein that circuit portion is so configured that a predetermined amount of deterioration wear in the critical region 11 substantially nullifies the separation or filter action.

It is to be noted that RFID transponders with IC and information memories, unlike 1-bit transponders (see FIG. 9) permit more intelligent systems which inter alia make it possible to determine the component or components in more complex installations, for example closer locating of the worn plastic part and for example also the use of a plurality of detector elements on an RFID chip (not shown), for example for more reliable detection. Function checking, for example as shown in FIGS. 16-18, is also made possible by uniquely associatable identification information.

FIGS. 19A-19B show a detection module 190 for original fitment or retro-fitment to energy guiding chains 1 of known structure. The detection module 190 has a plastic housing 191 produced in one piece as an injection moulding, with a plate-like flat mounting 192 for a usual RFID transponder. The transponder is inserted through an end opening slot into the mounting 192 and then secured to the housing 191 for example by casting or gluing. For installation in a chain link 7 the housing 191 has a first male connector 193A and a second female connector 193B in opposite relationship thereto in the longitudinal direction. The first connector 193A is of the same structure as the fixing horn which, for releasably fixing the transverse leg 9 or the opening leg, is typically formed on the side plates 8 of the chain links 7, that is to say it is of a positive shape matching the corresponding connector mounting on the transverse leg 9. The second connector 193B is of the same structure as the connector mounting on the transverse leg 9, that is to say it is of a negative shape matching the fixing horn on the side plate 8. In that way the detection module 190 can be fitted in place of a typical transverse leg 9, possibly using a shorter transverse leg as a connecting portion, as shown in FIG. 19B. The position of the mounting 192 is in this case displaced to project outwardly by a predetermined amount in the heightwise direction of the side plates 8 so that the radio circuit (not shown here) is disposed at the desired wear limit W that is to be detected.

FIGS. 20A-20D show as a further development of the invention a detection module 200 which is also particularly well suited for retro-fitment or original fitment to chain links 7 of a known energy guiding chain 1. The detection module 200 has a housing 291 of plastic with a flat, plate-like main portion 293 and a head 294 projecting transversely relative to the main plane of the main portion. The main portion 293 can be opened by way of a pivoting cover 295 by means of a film hinge 296 to introduce the radio circuit 10 into a suitable mounting 292 in the housing 291. In addition, the housing 291 has a latching tongue 298 for latching engagement into a recess 299 in the transverse leg 9, that extends in the longitudinal direction of the energy guiding chain 1. Such recesses 299 are typically provided in a grid-like pattern in order to mount known separating legs (not shown) for internal division at predetermined spacings on conventional transverse legs 9. Those recesses 299 can be used for fixing the detection module 200. Accordingly, the closed main portion 293 is in the form of an insertion lug or tongue in fitting relationship with the recess 299 of the transverse leg 9 and can thus be easily fitted as shown in FIGS. 20C-20D. The latching tongue 298 latches to the transverse leg 9 in order to secure the detection module 200 thereto.

The radio circuit 10 in FIGS. 20A-20D is of a particularly preferred two-part structure comprising a first circuit portion 10A and a flexible second circuit portion 10B. At least the integrated circuit or the microchip of the RFID transponder (see above) is provided in the first circuit portion 10A on a rigid substrate or carrier as a conventional circuit. The second circuit portion 10B is flexible, for example in the form of an FCB, "Flexprint", film circuit or the like. The second circuit portion 10B includes the detector element 26 in a space region spatially stepped from the first circuit portion 10A and displaced transversely relative to the main plane thereof, and the detector line to the first circuit portion 10A. Provided in the head 294 of the detection module 200 is a recess 297, by means of which the detector element 26 can be positioned and fixed in the second circuit portion 10B, for example being cast or glued therein, so that the spatial position thereof predetermines the wear limit W to be detected. In that way the position of the detector element 26 and therewith also the wear limit W can be selectively defined relative to the nominal position of the transverse leg 9 by virtue of the dimensioning, in particular structural height, of the head 294. The flexible circuit portion 10B permits the stepped projecting position of the detector element 26. The region of the head 294 with the detector element 26 is exposed to the deterioration wear and serves as a kind of intended breaking point.

The detector module 200 thus has a mechanical connector cooperating with a per se known counterpart portion of the energy guiding chain, for example the recess 299 for fixing separating legs (not shown) on the transverse leg 9. Detection modules 190, 200 as shown in FIGS. 19-20 permit simple and specific implementation in a dynamic line guide 1 of the functionality of an electrical deterioration detection means in critical longitudinal portions 14. The housing 192, 292 of the detection modules 190, 200 is preferably made from a less wear-resistant, in particular softer plastic, than the side plates 8 of the chain links 7.

FIGS. 21A-21B, as an alternative to the structure shown in FIGS. 1-4, show a dynamic line guiding unit 211 which in the longitudinal direction is composed portion-wise of a series of a plurality of segments 217 produced in one piece. The adjacent segments 217 are flexibly connected together in the longitudinal direction by a respective film hinge 219. The structure of the line guiding unit 211 is known per se, for example from WO 2005/040659 A1. This embodiment also provides a radio circuit 210 for the detection of deterioration in a critical region 11 of those segments 217 which are particularly susceptible to abrasion wear and/or fatigue fracture. Here the radio circuit 210 is fitted in the form of a self-sticking RFID tag to the underside, which is radially inward in the direction-changing arc, of selected segments 217. If the wear exceeds the wear limit W the radio circuit 210 also suffers from wear and thus becomes inoperative. In this case for example the antenna itself can represent the detector element and an inexpensive RFID tag can be used.

LIST OF REFERENCES

FIGS. 1-5
1 energy guiding chain
2 upper run 3 lower run
4 direction-changing arc
5 entrainment member
6 fixed points
7 chain link
8 side plate
10 radio circuit
11 critical region
12 RFID reading device
14 critical chain portion
15 plate break or plate crack (material fatigue)
W wear limit
FIGS. 6-8
11 critical region
20, 20A, 20B RFID transponder
21 RFID microchip
22 RFID antenna
23 carrier
24 detector line
26 detector element
28 shunt resistor
610, 710, 810 radio circuit
W wear limit
FIGS. 9A-9B
10 radio circuit
90 side plate
92 recess
93 side wall
94 closure element
FIG. 10
7 chain link
8 side plate
9 transverse legs
100 slide shoe
FIG. 11
11 critical region
24 detector line
26 detector element
120 RF transponder
122 RF induction antenna
125 RF capacitor
23 carrier
W wear limit
FIG. 12
24 detector line
1210 radio circuit
1221 RFID chip
1226, 1227 detector elements
1220 RFID transponder
C1 resonance capacitor
L1 resonance coil (antenna)
C2 interference capacitor
L2 interference coil
W1, W2 wear limits
FIG. 13
26 detector element
1310 radio circuit
1321 RFID chip
1320 RFID transponder
1322 dipole antenna
1330 IC
FIG. 14
26 detector element
1410 radio circuit
1421 RFID chip
1422 dipole antenna
FIG. 15
26 detector element
1510 radio circuit
1521 RFID chip
1522 dipole antenna
1540 detector circuit
1542 voltage source
1544 transistor (PNP)
1546 LED
1550 phototransistor (NPN)
FIGS. 16-18
11 critical region
1610; 1710; 1810 radio circuit
1621A RFID chip
1621B RFID chip
1622; 1722; 1822 antenna
1623 transmission line
1626 detector element
1627 stub line
W wear limit
FIGS. 19A-19B
190 detection module
191 housing
192 mounting
193A male connector
193B female connector
FIGS. 20A-20D
10 radio circuit
10A first circuit portion
10B second circuit portion
26 detector element
200 detection module
291 housing
292 mounting
293 main portion
294 head
295 pivot cover
296 film hinge
297 recess
298 latching tongue
299 recess (in the transverse leg 9)
FIGS. 21A-21B
11 critical region
211 line guiding unit
210 RFID tag
217 segment
219 film hinge
W wear limit

What is claimed is:

1. An energy guiding chain having electrical detection of deterioration, the energy guiding chain comprising:
a plurality of chain links forming a passage for protectively guiding at least one line between a first connection end and a second connection end moveable relative thereto,
adjacent chain links of the plurality of chain links connected together in a longitudinal direction hingedly or by a flexible connection,
an apparatus to detect deterioration wear in a critical region of at least one chain link of the plurality of chain links,
wherein the apparatus has a radio circuit and at least one detector element, which cooperates with the radio circuit,
wherein the radio circuit and the cooperating detector element are integrated in a detection module for original fitment or retro-fitment to an energy guiding chain and which is fixed to the at least one chain link, wherein the detector element changes behaviour of the radio circuit at a predetermined amount of wear in the critical region of the at least one link such that change due to deterioration wear is wirelessly detectable.

2. The energy guiding chain according to claim 1, wherein, in a wear-susceptible longitudinal portion of the energy guiding chain, more than one chain link of the plurality of chain links each have at least one detection module.

3. The energy guiding chain according to claim 1, wherein the detector element is in a form of a line portion of a detector line which extends in the critical region of the at least one chain link and which is interrupted at the predetermined amount of deterioration wear.

4. The energy guiding chain according to claim 3, wherein the radio circuit is a transponder and includes an antenna which is short-circuited by the detector element, and the detector element opens the short-circuit at the predetermined amount of deterioration wear.

5. The energy guiding chain according to claim 4, wherein the antenna is in a form of an induction coil or in a form of a dipole antenna.

6. The energy guiding chain according to claim 1, wherein the radio circuit is a transponder that includes an antenna which extends in the critical region and the detector element is part of the antenna which extends in the critical region and which is interrupted at the predetermined amount of deterioration wear.

7. The energy guiding chain according to claim 6, wherein the antenna is in a form of an induction coil or in a form of a dipole antenna.

8. The energy guiding chain according to claim 1, wherein the radio circuit is:
   in a form of a passive RFID transponder with a microchip which stores identification information; or
   in a form of an active RFID transponder with a microchip which stores identification information; or
   in a form of a passive 1-bit transponder, with an LC oscillating circuit as an antenna for a radio frequency.

9. The energy guiding chain according to claim 1, wherein the radio circuit is a transponder and the apparatus comprises at least one further transponder which is an independent test transponder for functional checking, the behaviour of which does not change due to wear.

10. The energy guiding chain according to claim 1, wherein the plurality of chain links each include oppositely disposed side plates, more than one chain link of the plurality of chain links have at least one transverse leg connecting the side plates, and the detector element is mounted to a wear-susceptible narrow side of a side plate, wherein the detection module cooperates with a connector on the chain link for mechanical fixing.

11. The energy guiding chain according to claim 1, wherein the plurality of chain links each include a segment that is produced in one piece and forms a passage for protectedly guiding the at least one line, wherein the segments of adjacent chain links of the plurality of chain links are respectively connected together in a longitudinal direction by a flexible connection.

12. The energy guiding chain according to claim 1, further comprising a plurality of detector elements arranged in critical regions on the at least one chain link or on adjacent chain links of the plurality of chain links and cooperate with a common radio circuit with a microchip.

13. The energy guiding chain according to claim 12, wherein the radio circuit is an RFID transponder.

14. The energy guiding chain according to claim 1, wherein the detector element is in a form of a passive circuit component or in a form of a conductor portion and cooperates with a common radio circuit with a microchip.

15. The energy guiding chain according to claim 14, wherein the radio circuit is an RFID transponder.

16. The energy guiding chain according to claim 1, wherein the critical region of the at least one chain link has an intended breaking point which triggers the detector element at the predetermined amount of wear, wherein the detector element is in a form of an electromechanical or electronic switching device.

17. The energy guiding chain according to claim 1, wherein the energy guiding chain has a lower run and an upper run which is slidable in relation thereto or which is self-supporting and the radio circuit and the detector element cooperating therewith are arranged in a portion of the upper run.

18. The energy guiding chain according to claim 1, wherein the deterioration wear comprises at least one of abrasion wear, cracking or fatigue breakage.

19. A system for electrical detection of deterioration including the energy guiding chain according to claim 1 and a reading device wirelessly cooperating with the radio circuit for wirelessly monitoring the radio circuit behaviour.

20. The system according to claim 19, including:
   an emergency shutdown device for stopping a consumer supplied by the energy guiding chain;
   a data interface to a maintenance signaling system; and/or
   a data interface to a merchandise management system.

21. A detection module for original fitment or retrofitment to a line guide with electrical detection of deterioration, comprising:
   a radio circuit having an antenna and a detector element, and
   a housing, having fixing members which cooperate with the line guide to fix the detection module to the line guide,
   wherein the housing is of such a configuration that a region of the housing with the detector element is exposed to a region which is critical in relation to deterioration wear,
   wherein the detector element changes behaviour of the radio circuit at a predetermined amount of wear in the region which is critical in relation to deterioration wear.

22. The detection module according to claim 21, comprising a two-part radio circuit which includes the radio circuit, with a rigid first circuit portion of the two-part radio circuit in which the antenna is provided and a second circuit portion of the two-part radio circuit in which the detector element is provided.

23. Use of a detection module according to claim 21 for electrically detecting deterioration in a critical region of a displaceable line guide, the deterioration due to abrasion wear, cracking and/or fatigue breakage,
   wherein, at a predetermined amount of deterioration wear, behaviour of a radio circuit arranged at the line guide changes and a reading device or transceiver wirelessly detects the change in behaviour of the radio circuit for the purpose of triggering a maintenance message and/or an emergency stop.

24. An active line guide comprising a detection module according to claim 21 for deterioration wear detection.

25. The detection module according to claim 21, wherein the fixing members cooperate with transverse legs of a chain link of an energy guiding chain or with connectors of transverse legs provided on side plates of a chain link of an energy guiding chain.

26. The detection module according to claim 21, wherein the radio circuit comprises a microprocessor and is an active radio circuit.

* * * * *